US012261365B2

(12) United States Patent
Aboserwal et al.

(10) Patent No.: US 12,261,365 B2
(45) Date of Patent: Mar. 25, 2025

(54) X-BAND DUAL-POLARIZED SLOTTED WAVEGUIDE ANTENNA (SWGA) ARRAY UNIT CELL FOR LARGE E-SCANNING RADAR SYSTEMS

(71) Applicant: The Board of Regents of the University of Oklahoma, Norman, OK (US)

(72) Inventors: Nafati Aboserwal, Norman, OK (US); Jorge L Salazar-Cerreno, Norman, OK (US); Zeeshan Qamar, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 116 days.

(21) Appl. No.: 18/245,484

(22) PCT Filed: Oct. 11, 2021

(86) PCT No.: PCT/US2021/054410
§ 371 (c)(1),
(2) Date: Mar. 15, 2023

(87) PCT Pub. No.: WO2022/081472
PCT Pub. Date: Apr. 21, 2022

(65) Prior Publication Data

US 2023/0361481 A1 Nov. 9, 2023

Related U.S. Application Data

(60) Provisional application No. 63/091,050, filed on Oct. 13, 2020.

(51) Int. Cl.
*H01Q 13/10* (2006.01)
*H01Q 3/36* (2006.01)
(Continued)

(52) U.S. Cl.
CPC ............. *H01Q 21/005* (2013.01); *H01Q 3/36* (2013.01); *H01Q 21/24* (2013.01)

(58) Field of Classification Search
CPC ......... H01Q 13/08; H01Q 13/10; H01Q 21/00; H01Q 21/005; H01Q 21/24; H01Q 3/36
See application file for complete search history.

(56) References Cited

U.S. PATENT DOCUMENTS 4,821,044 A * 4/1989 Kurtz .................. H01Q 21/005 343/771
5,831,581 A * 11/1998 Keough ............... H01Q 21/065 343/729
(Continued)

FOREIGN PATENT DOCUMENTS

EP 0440126 A1 8/1991
JP 2012204975 A 10/2012
JP 2020115618 A 7/2020

OTHER PUBLICATIONS

Extended European Search Report Application No. 21880846.7, dated Jan. 25, 2024, 9 pages.
(Continued)

*Primary Examiner* — Tho G Phan
(74) *Attorney, Agent, or Firm* — Conley Rose, P.C.; Grant Rodolph; Jonathan K. Polk

(57) ABSTRACT

An X-band dual-polarized slotted waveguide antenna (SWGA) array unit cell comprises a partial H-plane waveguide with a metal vane; and a conventional waveguide in a side-by-side arrangement with the partial H-plane waveguide. A spacing between elements of the X-band dual-polarized SWGA array unit cell in an azimuth plane is in a range of about 0.6λo to about 0.5λo. The X-band dual-polarized SWGA array unit cell has a one-dimensional (1D) electronic-scanning range of at least 84° (±42°) in the azimuth plane perpendicular to a waveguide axis. The
(Continued)

X-band dual-polarized SWGA array unit cell has a cross-polarization isolation of about −60 decibels (dB) or less.

20 Claims, 15 Drawing Sheets

(51) Int. Cl.
*H01Q 21/00* (2006.01)
*H01Q 21/24* (2006.01)

(56) References Cited

U.S. PATENT DOCUMENTS

| | | | | |
|---|---|---|---|---|
| 5,831,583 | A | 11/1998 | Lagerstedt et al. | |
| 6,947,003 | B2 * | 9/2005 | Huor | H01Q 21/064 343/770 |
| 7,576,703 | B1 * | 8/2009 | Herting | H01Q 21/0006 343/778 |
| 8,610,633 | B2 * | 12/2013 | Chen | H01Q 13/22 343/770 |
| 9,520,908 | B2 | 12/2016 | Li | |
| 10,431,902 | B2 * | 10/2019 | You | H01Q 21/064 |
| 2005/0146476 | A1 | 7/2005 | Wang et al. | |
| 2015/0029069 | A1 | 1/2015 | Roemer et al. | |
| 2016/0054439 | A1 | 2/2016 | Brookner et al. | |
| 2018/0277919 | A1 | 9/2018 | Deleniv et al. | |

OTHER PUBLICATIONS

Aboserwal, Nafti, et al.; "An Ultra-Compact X-Band Dual-Polarized Slotted Waveguide Array Unit Cell for Large E-Scanning Radar Systems" IEEE Access; Nov. 17, 2020; 12 pages.
Ahsan, Chaudhary Mohammed, et al.; Non-Inclined Slotted Waveguide Array with Various Shapes of Irises; International Journal of Advanced Engineering, Management and Science (IJAEMS); vol. 2, Issue 6; Jun. 2016; 4 pages.
Balanis, Constantine A.; "Chapter 6: Arrays: Linear, Planar, and Circular"; Antenna Theory Analysis and Design; Fourth Edition; Wiley; 2016; 45 pages.
Balanis, Constantine A.; "Chapter 7: Antenna Synthesis and Continuous Sources"; Antenna Theory Analysis and Design; Fourth Edition; Wiley; 2016; 64 pages.
Camblor Diaz, R., et al.; "Sub-Millimeter Wave Frequency Scanning 8×1 Antenna Array"; Progress in Electromagnetics Research; vol. 132; 2012; 18 pages.
Chen, Ming, et al.; "Dual-Band Dual-Polarized Waveguide Slot Antenna for SAR Applications"; IEEE Antennas and Wireless Propagation Letters; vol. 19, No. 10; Oct. 2020; 5 pages.
Chen, Ying, et al.; "Dual-Polarized L-Band and Single-Polarized X-Band Shared-Aperture SAR Array"; IEEE Transactions on Antennas and Propagation; vol. 66, No. 7; Jul. 2018; 10 pages.
Cullens, Evan D., et al. "Micro-Fabricated 130-180 GHz Frequency Scanning Waveguide Arrays"; IEEE Transactions on Antennas and Propagation; vol. 60, No. 8; Aug. 2012; 7 pages.
Derneryd, A. G., et al.; "Novel Slotted Waveguide Antenna with Polarimetric Capabilities"; IEEE; 1995; 3 pages.
Diaz, Jose D., et al.; "A Dual-Polarized Cross-Stacked Patch Antenna with Wide-Angle and Low Cross-Polarization for Fully Digital Multifunction Phased Array Radars"; IEEE; 2016; 4 pages.
Elliott, Robert S.; "An Improved Design Procedure for Small Arrays of Shunt Slots"; IEEE Transactions on Antennas and Propagation; vol. AP-31, No. 1; Jan. 1983; 6 pages.
Elliott, Robert S., et al.; "The Design of Small Slot Arrays"; IEEE; 1978; 6 pages.
Hashemi-Yeganeh, Shahrokh, et al.; "Analysis of Untilted Edge Slots Excited by Tilted Wires"; IEEE Transactions on Antennas and Propagation; vol. 38, No. 11; Nov. 1990; 9 pages.
Hung, Kuo-Lun, et al.; "A Design of Slotted Waveguide Antenna Array Operated at X-Band"; IEEE; 2010; 4 pages.
Kim, Dong-Won, et al.; "A Partial H-Plane Waveguide as a New Type of Compact Waveguide"; Microwave and Optical Technology Letters; vol. 43, No. 5; Dec. 5, 2004; 3 pages.
Kim, Dong-Won, et al.; "Compact Partial H-Plane Filters"; IEEE Transactions on Microwave Theory and Techniques; vol. 54, No. 11; Nov. 2006; 8 pages.
Kim, Dong-Jin, et al.; "Compact Resonant Slot Array Antenna Using Partial H-Plane Waveguide"; IEEE Antennas and Wireless Propagation Letters; vol. 9; 2010; 4 pages.
Kim, Dong-Won, et al.; "Partial H-Plane Filters with Partially Inserted H-Plane Metal Vane"; IEEE Microwave and Wireless Components Letters; vol. 15, No. 5; May 2005; 3 pages.
Kim, Dong-Jin, et al.; "Resonant Array Antenna using Inclined Sidewall Slot in Partial H-plane Waveguide"; IEEE; 2009; 2 pages.
Knorr, Jeffrey B.; "Analysis of Performance Characteristics of the Naval Postgraduate School MWR-05XP Mobile Weather Radar"; Navel Postgraduate School; NPS-EC-05-005; Dec. 2005; 52 pages.
Li, Teng, et al.; "Design and Implementation of Dual-Frequency Dual-Polarization Slotted Waveguide Antenna Array for Ka-Band Application"; IEEE Antennas and Wireless Propagation Letters; vol. 13; 2014; 5 pages.
Muller, M. et al.; "Improving the Bandwidth of a Slotted Waveguide Array by Using a Centre-Feed Configuration"; IEEE; 1999; 6 pages.
Munson, Robert E.; "Conformal Microstrip Antennas and Microstrip Phased Arrays"; IEEE Transactions on Antennas and Propagation; Jan. 1974; 5 pages.
Ortiz, Javier A., et al.; "Low-Cost CMOS Active Array Solution for Highly Dense X-Band Weather Radar Network"; IEEE Transactions on Antennas and Propagation; vol. 68, No. 7; Jul. 2020; 10 pages.
Qamar, Zeeshan, et al.; "An Ultra-Wide Band Radome for High-Performance and Dual-Polarized Radar and Communication Systems"; IEEE Access; Oct. 21, 2020; 13 pages.
Rezaiesarlak, R., et al.; "Dispersion Characteristics of Partial H-Plane Waveguides"; Progress in Electromagnetics Research Letters; vol. 24; 2011; 8 pages.
Salazar, Jorge L., et al.; "Transmit/Receive (T/R) Modules Architectures for Dual-Polarized Weather Phased Array Radars"; 2015 IEEE Mtt-S International Microwave Symposium; 2015; 4 pages.
Stern, George J., et al.; "Resonant Length of Longitudinal Slots and Validity of Circuit Representation: Theory and Experiment"; IEEE Transactions on Antennas and Propagation; vol. AP-33, No. 11; Nov. 1985; 8 pages.
Stevenson A. F.; "Theory of Slots in Rectangular Wave-Guides"; Journal of Applied Physics; vol. 19; Jan. 1948; 16 pages.
Wang, Yanting, et al.; "Polarization Isolation Requirements for Linear Dual-Polarization Weather Radar in Simultaneous Transmission Mode of Operation"; IEEE Transactions on Geoscience and Remote Sensing; vol. 44, No. 8; Aug. 2006; 10 pages.
Wang, Wei, et al.; "Waveguide Slotted Antenna Array with Broadband, Dual-polarization and Low Cross-Polarization for X-Band SAR Applications"; IEEE; 2005; 4 pages.
Yuan, Yuan, et al.; "Analysis of Shaped-Differ Impelled-Pins in Edge Wall Waveguide Slot"; IEEE; 2013; 4 pages.
Zhang, Yu-Mei, et al.; "Design of Ultralow Sidelobe Antenna Arrays with Inclined Slots in the Narrow Wall of Rectangular Waveguide"; IEEE; 2003; 5 pages.
Zrnic, Dusan S., et al.; "System Requirements for Phased Array Weather Radar"; NOAA/NSSL, Technical Report; 2005; 24 pages.
PCT International Search Report and PCT Written Opinion of the International Searching Authority; Application No. PCT/US2021/054410; Jan. 28, 2022; 17 pages.

* cited by examiner

X-BAND DUAL-POLARIZED SLOTTED WAVEGUIDE ANTENNA (SWGA) ARRAY UNIT CELL FOR LARGE E-SCANNING RADAR SYSTEMS

CROSS-REFERENCE TO RELATED APPLICATION

This is a national stage application of Int'l Patent App. No. PCT/US21/54410 filed on Oct. 11, 2021, which claims priority to U.S. Prov. Patent App. No. 63/091,050 filed on Oct. 13, 2020, both of which are incorporated by reference.

BACKGROUND

Modern radar and communication systems demand the design of an antenna with polarization-agile ability since the polarization diversity can significantly improve the system performance. Dual-polarized phased array antennas with a low side lobe, high efficiency and low cross-polarization are in demand to improve the observational range and observation accuracy of radar systems and communication systems. In general, the dual-polarized antenna arrays are mainly formed by the microstrip patch antennas. However, loss of performance and some complications with feeding techniques and with materials suitable for environments make slotted waveguide antenna arrays an attractive alternative solution, in particular at higher frequencies. Slotted waveguide antenna (SWGA) arrays have been used for decades, mostly for radar applications in civil and military applications. Their advantages and drawbacks from both the mechanical and the electromagnetic standpoint are therefore well known. Slotted waveguide antenna arrays guarantee several advantages such as a high gain, low losses, a low profile, thermal stability, a precise control of aperture excitation, simple feeding, high-power handling, robustness, and reliability.

The two main types of slotted waveguide antenna arrays are resonant and traveling wave antennas. In the resonant type, one end or both ends of the waveguide is terminated by short circuit. This results in a standing wave inside the waveguide. In order to have maximum current perturbation and excite the slot in the waveguide wall, the slot is cut where the maximum electric field is located. In the traveling type, SWGA is terminated by a matched load to absorb the wave and prevent it from reflection and forming a standing wave.

In general, the main antenna configuration of SWGAs with dual polarization is achieved by interleaving two types of linear SWGAs having orthogonal polarizations, namely, vertical polarization (VP) and horizontal polarization (HP). In the most basic dual-polarized SWGA architecture, the same waveguide is used for both vertical and horizontal linear polarizations. It comprises broad wall shunt slots for VP and inclined edge wall slots for HP. Although this architecture is simple and easy to design and manufacture, it has the major drawbacks of limited electronic scan capability due to the inter-waveguide spacing (>$1.2\lambda_o$) and high cross-polarization level (worse than −30 decibels (dB)), and high shoulder and side lobes, especially for the horizontally polarized array due to the inclined slots. $\lambda_o$ is the free-space wavelength. To minimize the presence of the undesired cross-polarization of inclined edge wall slot waveguide, several designs were developed to replace the inclined edge wall slots with non-inclined edge wall slots. For example, the excitation of the un-tilted slots can be provided by placing wires inside the waveguide. The un-tilted slot is excited by a pair of transversely placed tilted wires. These wires are connected between the broad walls and the side wall. The level of the un-tilted slot excitation is controlled by the separation of these two wires and their tilts. Shaped irises can be placed inside the waveguide to excite the un-tilted slots. In another version, two interleaved antennas radiating two orthogonal linear polarizations have been proposed. The HP is realized with an un-tilted narrow wall slot array with slots excited by pairs of irises, while the VP is realized with a ridged waveguide longitudinal slot array. In this design, the antenna at 9.6 gigahertz (GHz) has a scan range of ±2° transverse the array axis in the elevation cut with a cross-polarization level of more than 25 dB below the main beam peak. Another version proposes a dual linear-polarization antenna having a VP longitudinal-slot ridged waveguide array interleaved with an HP transverse-slot ridged waveguide array. This design allows about 20° vertical scan range.

In U.S. Pat. No. 5,831,583, which is incorporated by reference, a broadband dual-polarization slotted waveguide planar antenna array for X-band synthetic aperture radar (SAR) application was disclosed. The VP is realized with a ridged-waveguide longitudinal slot linear antenna array, while the HP is realized with an un-tilted narrow-wall slot linear array excited by shaped irises inside the waveguide. This structure allows ±20° beam scanning across the elevation direction without grating lobes. The separation of the waveguides in the antenna array has to be equal to or lower than $0.7\lambda_o$. In another dual-band and dual-polarization slotted waveguide antenna array, designed and tested in Ka-band and L-band, an inclined slot was used in the narrow wall of rectangular waveguides for HP and a longitudinal slot was used on the wide wall and employed for VP. The two arrays are interlaced with each other and fed from the opposite sides. Because of the antenna spacing of $0.7\lambda_o$ this antenna array has a limited scan, up to 40° (±20°). Dual polarized is reported for L-band.

Scanning Performance Limitations of Conventional Dual-Polarized SWGA Arrays

For planar SWGA arrays, the antenna beam is electronically scanned in a direction perpendicular to the waveguide axis by phase steering. In this case, each slotted waveguide acts as one element in a one-dimensional scanning array. Inability to fully steer the antenna beam in all directions is one of the severe limitations of this antenna type. However, there are some situations where a one-dimensional electronic scan is sufficient for single-polarization planar slotted waveguide antenna arrays.

For single-polarized SWGA arrays, it is also possible to implement electronic beam steering using a conventional or standardized waveguide, which has standardized dimensions, for each polarization (HP and VP), separately in the plane perpendicular to the waveguide axis. The standardized dimensions may include inside dimensions of 0.9 inches (in)×0.4 in. In one version, the linear array with inclined slots cut in the narrow wall of waveguide for HP is traditionally used to compose electronically scanned array in elevation. However, the frequency scanning technique is usually used to scan the beam along the waveguide axis. Frequency or traveling-wave arrays usually offer limited scanning range (<20°). Typically, those arrays require 200 megahertz (MHz) to 400 MHz, so symmetry of beam patterns and low side lobe level are difficult to obtain.

Single-polarization planar arrays of radiating longitudinal slots cut in the broad walls of rectangular waveguides may be electronically scanned in the E-plane by including phase shifters between adjacent waveguides. In this case of longitudinal offset slots in the broad walls, the scanning range is limited because of the broad wall dimension being greater than half wavelength in free space. Conventional rectangular waveguides typically have an 'a' broad wall dimension of $0.7\lambda_o$ at the operating frequency. Therefore, it is possible to scan the antenna main beam to a maximum angle of 25° off broadside before grating lobes start appearing in the visible space. Single-polarization planar arrays of radiating transverse slots cut in the narrow walls of rectangular waveguides may be electronically scanned in the H-plane by including phase shifters between adjacent waveguides. These adjacent waveguides with edge wall slots may be placed with a spacing of half wavelength in free space. Therefore, it is possible to scan such arrays electronically over a wide angular range. Conventional rectangular waveguides typically have an 'b' narrow wall dimension of $0.5\lambda_o$ at the operating frequency. Therefore, it is possible to scan the antenna main beam to a maximum angle of 90° off broadside before grating lobes start appearing in the visible space.

Recently, much attention has been paid to wide scan dual polarization slotted waveguide antenna arrays due to high power capability and mechanical stability. The dual-polarization feature is achieved by combing side by side two types of linear SWGAs having orthogonal polarizations, namely, VP and HP. The performance of current dual polarized SWGA arrays using conventional rectangular waveguides has a major limitation, i.e., the scan in the plane perpendicular to the waveguide axis is restricted. This is because the center-to-center spacing of the dual polarized structure is more than one wavelength which will produce grating lobes in case the beam is scanned. Simply, it is impossible to electronically scan in the plane perpendicular to the waveguide axis without grating lobes being visible using the conventional waveguides.

The maximum element spacing ($d_{max}$) for the dual-polarized SWGA array scanned to a given scan angle ($\theta_s$) is given by Equation (1), where $\theta_{GL}$ is the angle of the first grating lobe and $\lambda_o$ is the free space wavelength at the operation frequency.

$$d_{max} = \frac{\lambda_o}{\sin\theta_{GL} + \sin\theta_s} \quad (1)$$

For grating lobe radiation at grazing angle ($\theta_{GL}$=90°) the equation is expressed as Equation (2).

$$d_{max} = \frac{\lambda_o}{1 + \sin\theta_s} \quad (2)$$

As noted above, the performance of current dual polarized SWGA arrays using conventional rectangular waveguides is limited because the scan in the plane perpendicular to the waveguide axis is restricted. The present disclosure is directed, in at least one embodiment, to improving the performance of SWGA arrays in this regard.

BRIEF DESCRIPTION OF THE DRAWINGS

Several embodiments of the present disclosure are hereby illustrated in the appended drawings. It is to be noted, however, that the appended drawings illustrate several embodiments and are therefore not intended to be considered limiting of the scope of the present disclosure.

FIG. 6A is a side view of dual-polarized element and feed structure, and FIG. 6B is a 3D perspective view of the dual-polarized antenna element of FIG. 6A. In FIG. 6A, values for a and b are 22.68 mm and 10.16 mm, respectively. Values for a' and b' are 11.43 mm and 6 mm, respectively. Values for $t_s$ is 1.27 mm. Values for other dimensions are shown in Table 2.

DETAILED DESCRIPTION

Figure 1A:
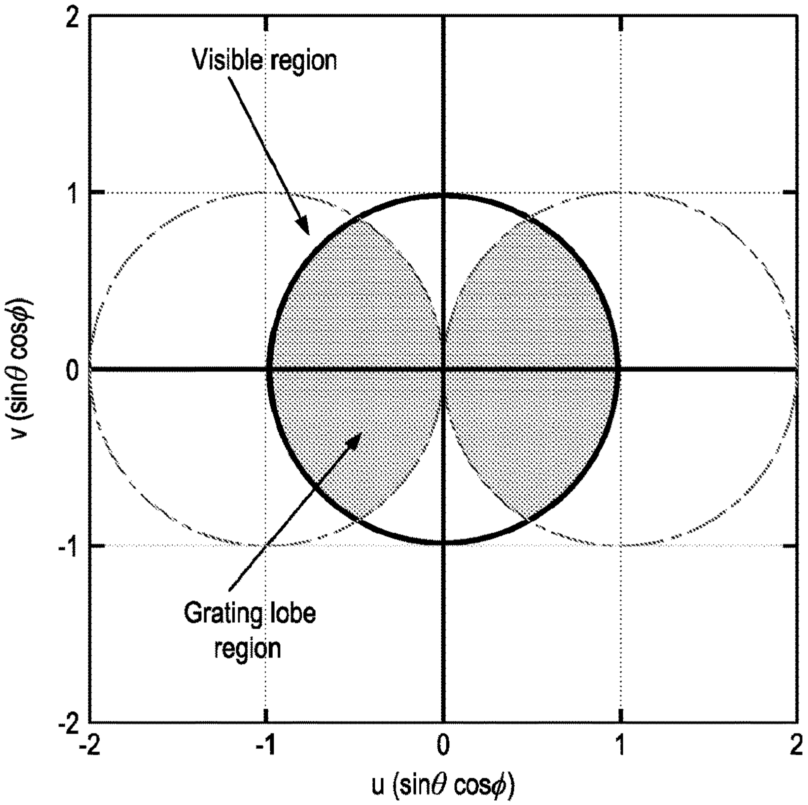
FIG. 1A shows a grating lobe diagram using a conventional waveguide unit cell for dual-polarized array antenna. The convention unit cell is shown in FIG. 1B.

The present disclosure describes a novel electronical-scanning (e-scanning) dual-polarized array constructed with slotted-waveguide antenna (SWGA) technology that is designed for 200 MHz bandwidth, has a one-dimensional (1D) e-scanning range of 84°(±42°), or more and has cross-polarization isolation of about −60 dB or less. The disclosed ultra-compact X-band dual-polarization SWGA array unit cell having high polarized performance over 200 MHz bandwidth and wide scan in the azimuth plane is ideal for use in high-power dual-polarized radar systems such as those used for observing and tracking weather. The array uses an ultra-compact array unit cell where the overall dimensions are reduced to about 50% in comparison with that of a dual-polarization SWGA array that uses conventional rectangular waveguides. The new design overcomes a fundamental limitation of zero e-scanning caused by large element spacing (1.2$\lambda_o$) in antennas which use conventional waveguides. Reducing the element spacing to at least 0.6$\lambda_o$ (in the azimuth plane), based on partial H-plane waveguides, enables a 1D e-scanning range up to at least 84° (±42°) in the azimuth plane perpendicular to the waveguide axis. In one non-limiting embodiment, the design uses an active sub-array panel of 8×8 elements, excited with 8 high-power transmit and receive modules. This active sub-array can be scaled to obtain a large array without constraints in size and power. The disclosed system uses the broad wall shunt slots for VP antenna and non-inclined edge wall slots for HP antenna. The disclosed system offers stable impedance, gain, cross-polarization isolation, and excellent co-polar mismatch over the whole frequency band of interest. Having a cross-polarization isolation below −60 dB and co-polar mismatch below ±0.12 dB across the scanning range, make this array unit cell (e.g., with 8×8 elements) ideal for high power e-scanned dual-polarization phased array radar, for example for weather observations. In the present disclosure, the term "ultra-compact" refers to a SWGA array unit cell having element spacing reduced to 0.6$\lambda_o$ (in the azimuth plane) or less (i.e., a reduction of 50% or more vs. a conventional spacing of 1.2$\lambda_o$). In certain embodiments, the element spacing can be as low as 0.5$\lambda_o$ (in the azimuth plane) providing a reduction of about 58%, enabling a 1D e-scanning range up to about 180° (±90°) in the azimuth plane perpendicular to the waveguide axis.

Before describing various embodiments of the present disclosure in more detail by way of exemplary description, examples, and results, it is to be understood that the present disclosure is not limited in application to the details of methods and compositions as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series.

Thus, to illustrate reference to a series of ranges, for example, of 1-10, 10-20, 20-30, 30-40, 40-50, 50-60, 60-70, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. A reference to degrees such as 1 to 90 is intended to explicitly include all degrees in the range. A reference to the number of unit cells in a sub-array panel, such as 4-256, 4-400, or 4-676, is intended to include all whole numbers (positive integers) within each range.

In certain embodiments, the element spacing of the disclosed SWGA array units can be in a range of about 0.6 $\lambda_o$ to about 0.5 $\lambda_o$ (in the azimuth plane), providing a reduction of from about 50% to about 58% vs. a conventional spacing of 1.2 $\lambda_o$, thereby enabling a 1D e-scanning range in a range of from about 84° (±42°) up to at about 180° (±90°) in the azimuth plane perpendicular to the waveguide axis. For example, the element spacing may be from 0.6$\lambda_o$, to about 0.59$\lambda_o$, to about 0.58$\lambda_o$, to about 0.57$\lambda_o$, to about 0.56$\lambda_o$, to about 0.55$\lambda_o$, to about 0.54$\lambda_o$, to about 0.53$\lambda_o$, to about 0.52$\lambda_o$, to about 0.51$\lambda_o$, to about 0.50$\lambda_o$, or fractional portions thereof, thereby enabling a 1D e-scanning range of from about 84° (±42°), to about 86° (±43°), to about 88° (±44°), to about 90° (±45°), to about 92° (±46°), to about 94° (±47°), to about 96° (±48°), to about 98° (±49°), to about 100° (±50°), to about 102° (51°) to about 104° (±52°), to about 106° (±53°), to about 108° (±54°), to about 110° (±55°), to about 112° (56°), to about 114° (±57°), to about 116° (±58°), to about 118° (±59°), to about 120° (±60°), to about 122° (61°), to about 124° (±62°), to about 126° (±63°), to about 128° (±64°), to about 130° (±65°), to about 132° (66°), to about 134° (±67°), to about 136° (±=68°), to about 138° (±69°), to about 140° (±70°), to about 142° (71°), to about 144° (±72°), to about 146° (±73°), to about 148° (±74°), to about 150° (±75°), to about 152° (76°), to about 154° (±77°), to about 156° (±78°), to about 158° (±79°), to about 160° (±80°), to about 162° (81°), to about 164° (±82°), to about 166° (±83°), to about 168° (±84°), to about 170° (±85°), to about 172° (86°), to about 174° (±87°), to about 176° (±88°), to about 178° (±89°), to at about 180° (±90°). Cross-polarization isolation may be within a range of about −55 dB to about −70 dB, but will generally be within a range of about −60 dB to about −70 dB.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" and "approximately" are used to indicate that a value includes the inherent variation of error. Further, in this detailed description, each numerical value (e.g., degrees or frequency) should be read once as modified by the term "about" (unless already expressly so modified), and then read again as not so modified unless otherwise indicated in context. As noted, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. The use of the term "about" may mean a range including ±10% of the subsequent number unless otherwise stated.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., degrees, frequency, width, length, etc.).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The processes described in the present disclosure can be performed with the aid of a computer system running software adapted to perform the functions, and the resulting images and data may be stored on one or more non-transitory computer readable mediums. Examples of a non-transitory computer readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware may be executed on any appropriate hardware which may be a dedicated system or systems, or a specially programmed computer system, or distributed processing computer system. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the optical images, thermal images, RF information, or thereafter or combinations thereof.

More particularly, in a non-limiting first embodiment, the present disclosure is directed to an X-band dual-polarized slotted waveguide antenna (SWGA) array unit cell which comprises a partial H-plane waveguide with a metal vane; and a conventional waveguide in a side-by-side arrangement with the partial H-plane waveguide, wherein a spacing between elements of the X-band dual-polarized SWGA array unit cell in an azimuth plane is in a range of about $0.6\lambda_o$ to about $0.5\lambda_o$, wherein the X-band dual-polarized SWGA array unit cell has a one-dimensional (1D) electronic-scanning range of at least 84° (±42°) in the azimuth plane perpendicular to a waveguide axis, and wherein the X-band dual-polarized SWGA array unit cell has a cross-polarization isolation of about −60 decibels (dB) or less. In implementations of this embodiment, the 1D electronic-scanning range is within a range of 84° (±42°) to 180° (±90°). The cross-polarization isolation is in a range of about −60 dB to about −70 dB. The conventional waveguide comprises standardized dimensions. $\lambda_o$ is a free-space wavelength.

In a non-limiting second embodiment, the present disclosure is directed to a sub-array panel comprises a plurality of the X-band dual-polarized SWGA array unit cell of the first embodiment or its implementations. In implementations of this embodiment, the plurality of the X-band dual-polarized SWGA array unit cell may be in a range of from 4 to 676, such as from 4 to 400, or from 4 to 256, or from 64 to 144, for example. The plurality of the X-band dual-polarized SWGA array unit cell comprises $n^2$ of the X-band dual-polarized SWGA array unit cell arranged in an n×n configuration, wherein n is in a range of from 2 to 26. The plurality of the X-band dual-polarized SWGA array unit cell comprises $n^2$ of the X-band dual-polarized SWGA array unit cell arranged in an n×n configuration, wherein n may be in a range of from 4 to 16, such as from 8 to 12.

In a third non-limiting embodiment, the present disclosure is directed to a radar array comprising a plurality of the sub-array panel of the second embodiment or its implementations.

In a fourth non-limiting embodiment, the present disclosure is directed to a method of radar tracking comprising using the radar array of the third embodiment to monitor weather or track moving objects.

Any of the above embodiments may be combined with any of the other above embodiments to create a new embodiment. These and other features will be more clearly understood from the following detailed description taken in conjunction with the accompanying drawings and claims.

The present disclosure will now be discussed in terms of several specific, non-limiting, examples. The examples described below, which include particular embodiments, will serve to illustrate the practice of the present disclosure, it being understood that the particulars shown are by way of example and for purposes of illustrative discussion of particular embodiments of the present disclosure only and are presented in the cause of providing what is believed to be a useful and readily understood description of construction procedures as well as of the principles and conceptual aspects of the inventive concepts.

Figure 1B:
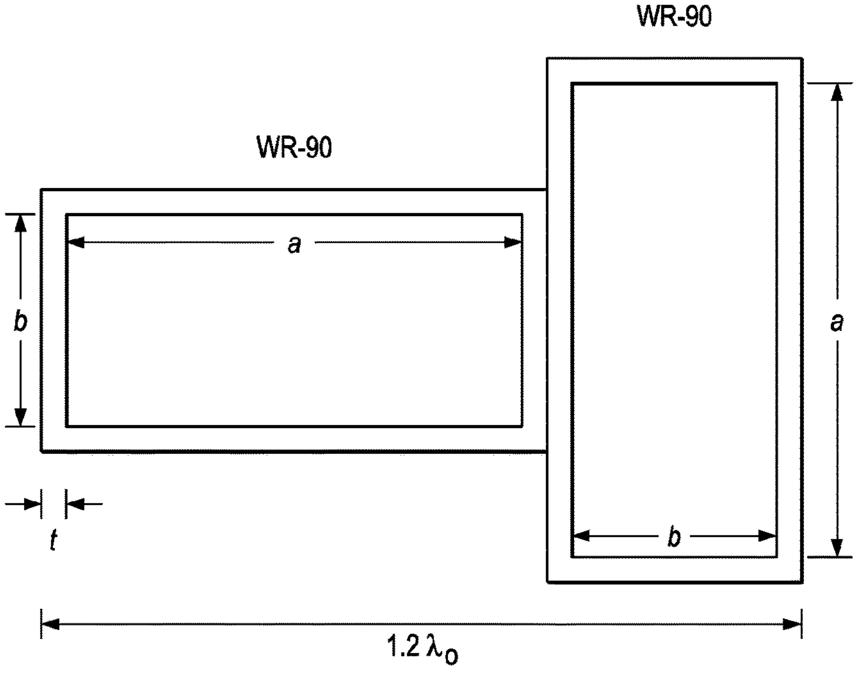
FIG. 1B shows a dual-polarized unit cell based on convectional WR-90 waveguides. Unit cell spacing is $1.2\lambda_o$.
Figure 1C:
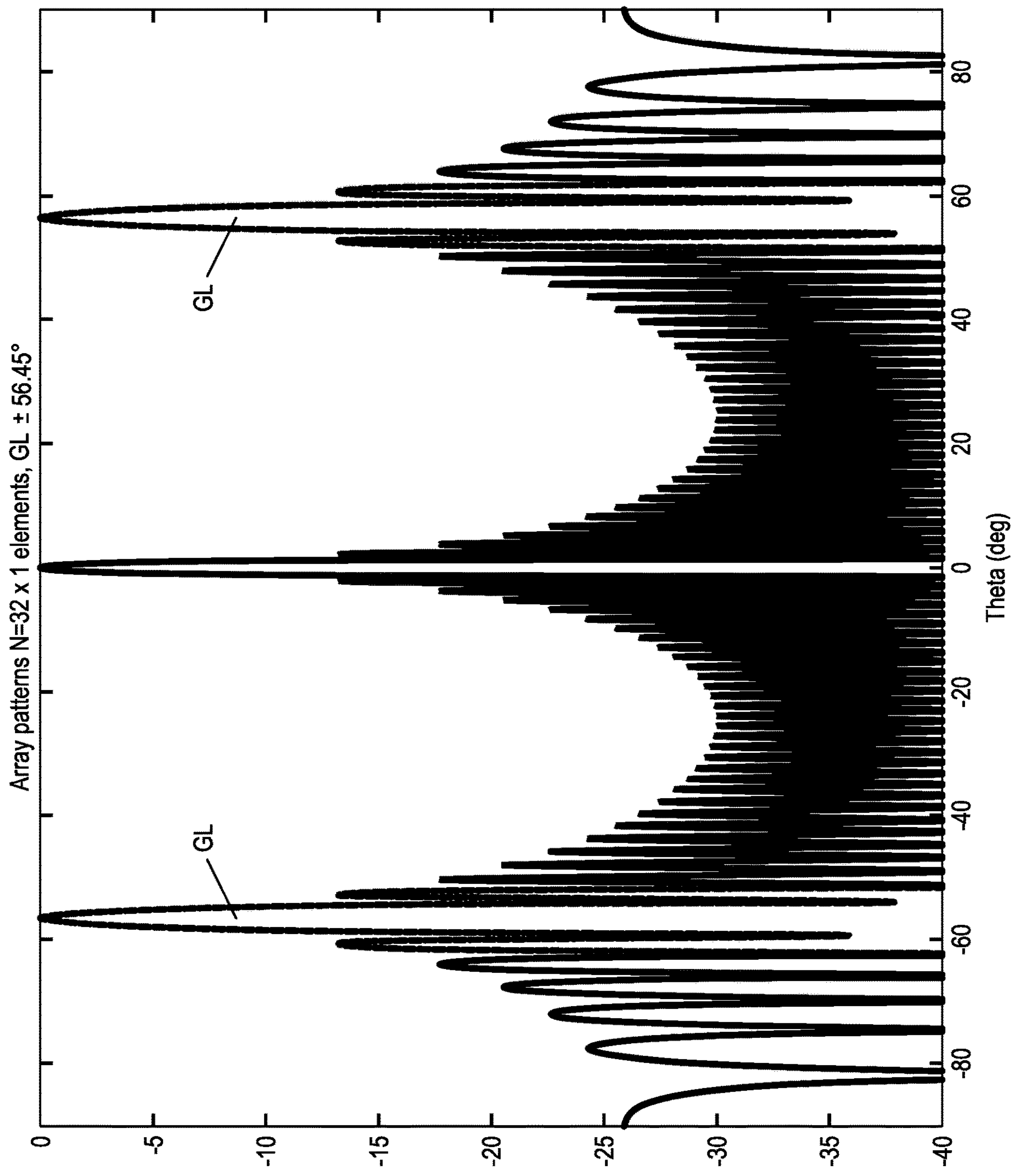
FIG. 1C shows an array antenna pattern of 32×1 linear array of unit cells having spacing of 1.2 $\lambda_o$.

Solution to the Problem of Using Conventional Waveguides in SWGA Array Unit Cells As noted above, the performance of prior dual polarized SWGA arrays using conventional rectangular waveguides is limited because the scan in the plane perpendicular to the waveguide axis is restricted. FIGS. 1A-1F show results of a grating lobe diagram analysis to illustrate the impact of dual polarization unit cell spacing in the visible region at 9.4 GHz. FIGS. 1A-1C present the case for a conventional waveguide structure in which the azimuth is separated by $1.2\lambda_o$. In this case, grating lobes in the azimuth plane fully overlap the visible region at any scanning angle. Therefore, it is impossible to scan the antenna beam without grating lobes appearing in the visible space. FIG. 1C shows that using this spacing for a linear array with 32 elements will produce grating lobes in the visible region even though the beam is not scanned. In this case, conventional WR-90 waveguide structures are used for HP and VP.

Figure 1D:
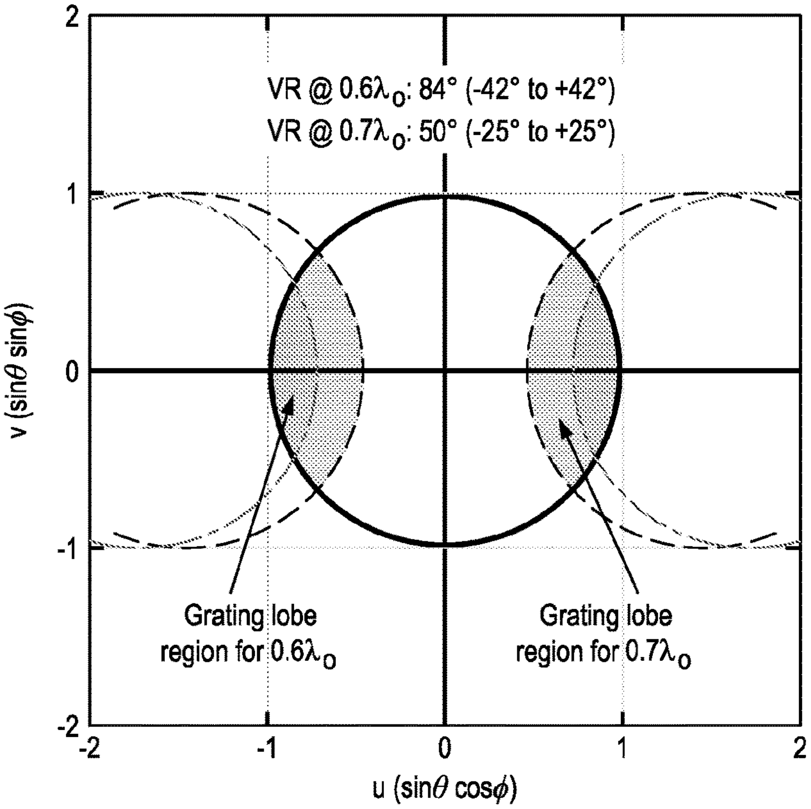
FIG. 1D shows a grating lobe analysis for dual-polarized unit cells based on compact waveguides using standard waveguides of FIG. 1E with $0.7\lambda_o$ and $0.6\lambda_o$ spacings.
Figure 1E:
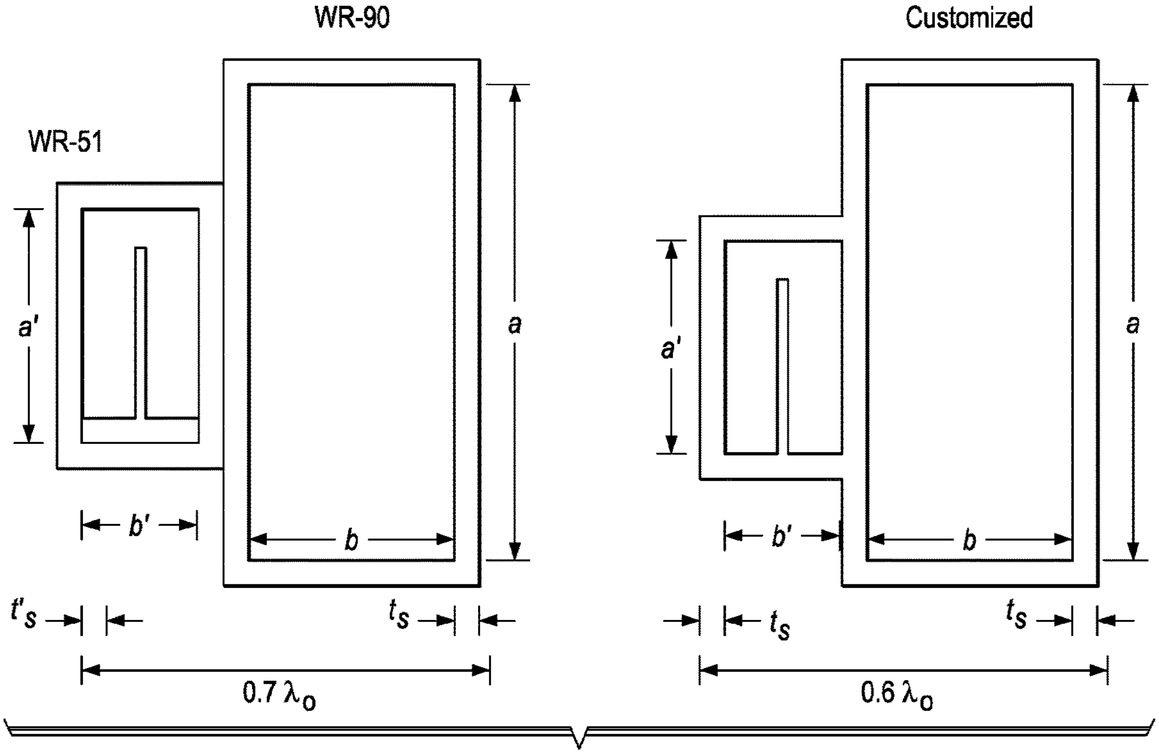
FIG. 1E shows a unit cell with WR-51 for VP and WR-90 for HP (left-hand) and a customized version wherein the VP waveguide and H waveguide share a common wall (right-hand). The compact waveguide in each left-hand and right-hand cell that has the lesser cross-sectional area, with a vertical wall therein, is called a partial H-plane waveguide. Values for a and b are 22.68 millimeter (mm) and 10.16 mm, respectively. Values for a' and b' are 11.43 mm and 6 mm, respectively. Values for $t_s$ and $t'_s$ are 1.27 mm.
Figure 1F:
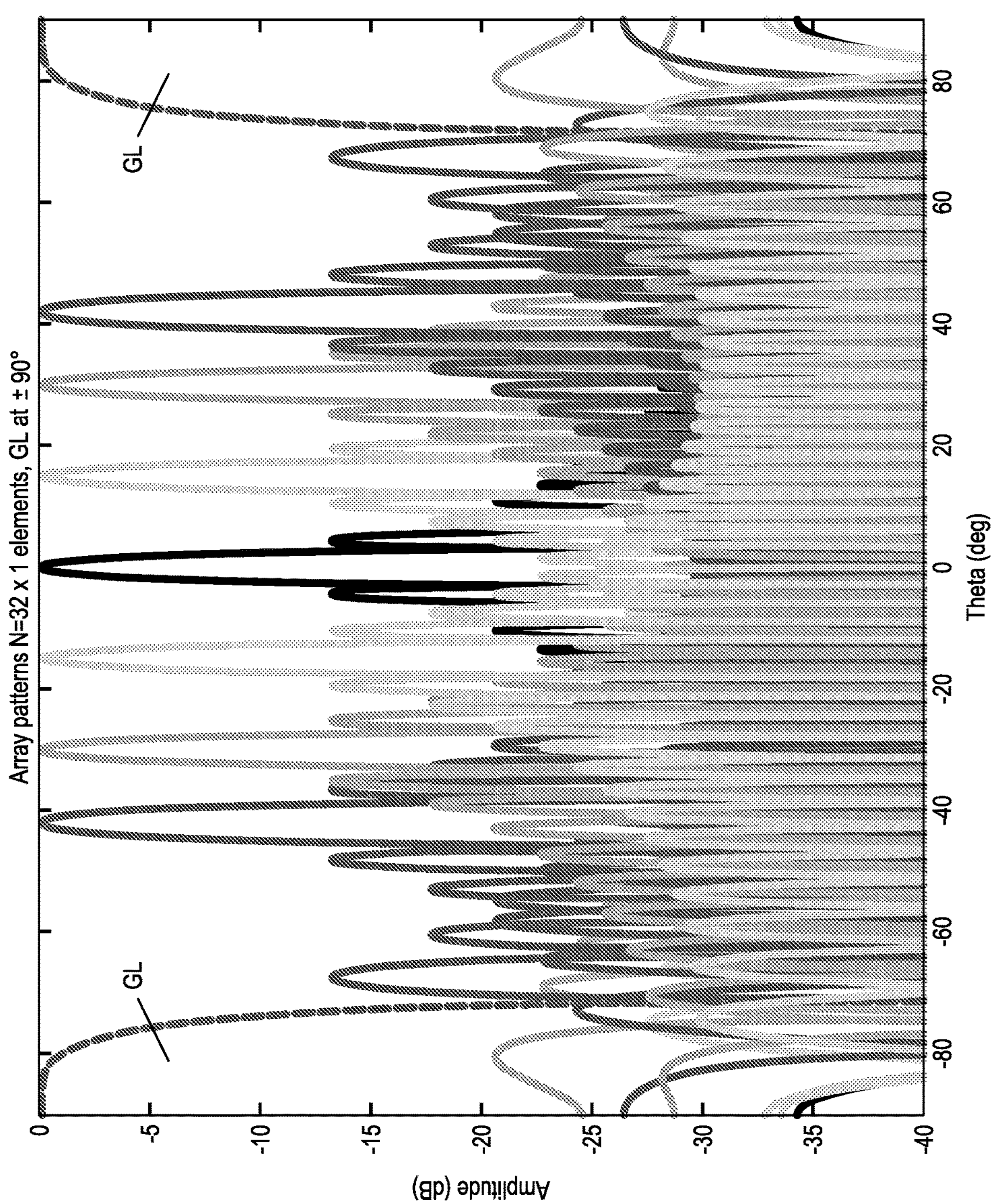
FIG. 1F shows an array antenna pattern of 32×1 linear array with spacing of 0.6 $\lambda_o$. Grating lobe only appears after electronic-scanning is larger than ±42°.

In the present disclosure, in one embodiment, a compact waveguide structure was used where the unit cell spacing in azimuth plane can be between $0.6\lambda_o$ and $0.7\lambda_o$. FIGS. 1D-1F illustrate the grating lobe analysis for both cases. For $0.7\lambda_o$, the WR-90 waveguide is used for HP and WR-51 waveguide is used for VP. Because of $0.7\lambda_o$ spacing, a scanning range up to 50° (±25°) in the azimuth plane can be obtained. Spacing of $0.6\lambda_o$ can be obtained with a customized waveguide structure. This element spacing increases the scanning range up to 84° (±42°). FIGS. 1D-1E illustrate both cases, and FIG. 1F shows the ideal e-scanned patterns of a linear array with 32 elements. Grating lobes appear only when the array is scanned after ±42°. The scanning performance of a dual-polarization SWGA using spacings of $1.2\lambda_o$, $0.7\lambda_o$ and $0.6\lambda_o$ is summarized in Table 1.

TABLE 1

Scanning performance of a dual-polarization linear SWGA using a spacing of 1.2λo, 0.7λo and 0.6λo at 9.4 GHz.
A Novel Dual Polarization Antenna Array

| | Conventional [23] | | Proposed | | | |
|---|---|---|---|---|---|---|
| | WR-90 | WR-90 | WR-90 | WR-51 | Customized | |
| | H-pol | V-pol | H-pol | V-pol | H-pol | V-pol |
| Element spacing | $1.2\lambda_o$ | $1.2\lambda_o$ | $0.7\lambda_o$ | $0.7\lambda_o$ | $0.6\lambda_o$ | $0.6\lambda_o$ |
| Max. scanning | 0° | | 50° (−25° to +25°) | | 84° (−42° to +42°) | |

In the present disclosure, in one embodiment, a dual-polarized slot array comprises a VP linear array and an HP linear array. A small array, as an array unit cell, was used to verify the proposed concept. Both VP and HP linear arrays used to build dual polarization compact planar antenna arrays are explained below.

The VP Linear Array

The partial H-plane waveguide is a rectangular waveguide with a quarter reduction in the cross-sectional area which is implemented by a concept of folded waveguide. Recently, structures such as filters were designed based on partial H-plane waveguides. It has been widely utilized to design compact waveguide filter named as partial H-plane filter. Nowadays, these structures are being used to design linear slotted waveguide antenna arrays with single polarization.

Figure 2:
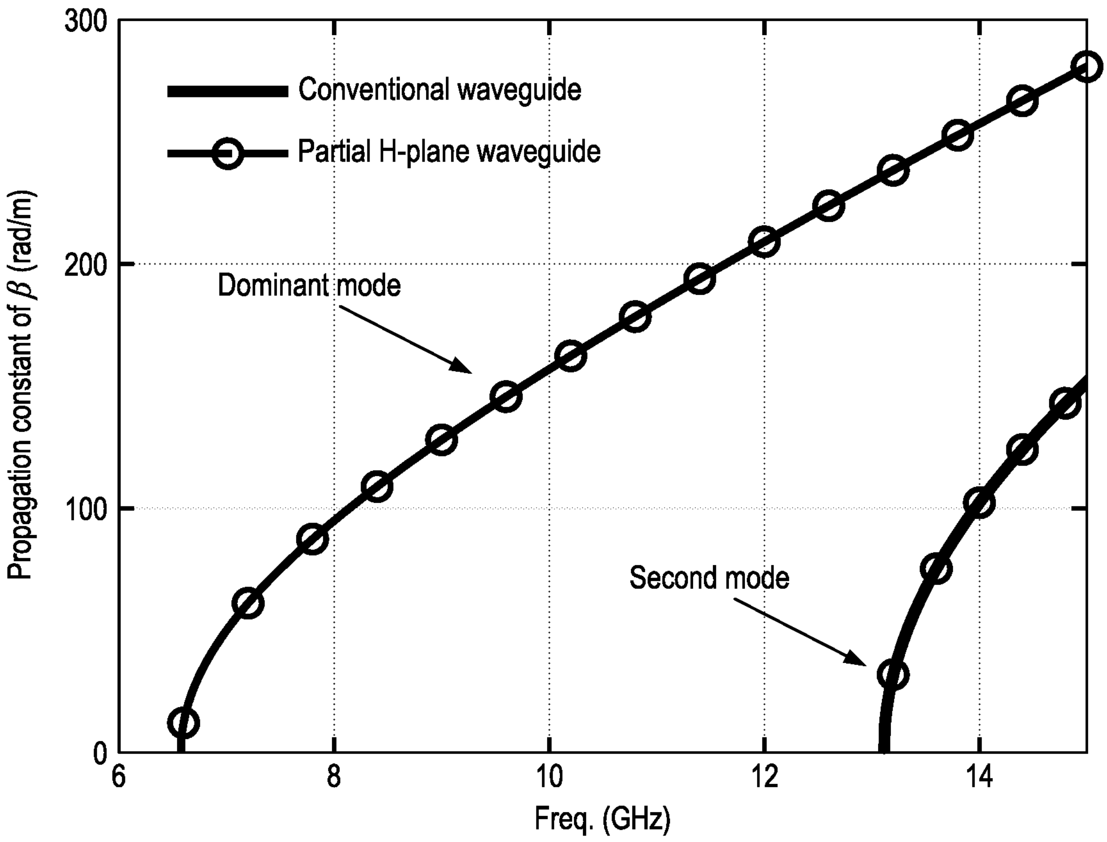
FIG. 2 shows dispersion characteristics of an X-band conventional rectangular waveguide with a=22.86 mm and b=10.16 mm and a partial H-plane rectangular waveguide a=11.43 and b=6 mm, and metal vane height and thickness of 9.5 mm and 0.1 mm.

The partial H-plane waveguide is a transversely folded rectangular waveguide that has a partially inserted metal vane in the H-plane. The dominant and second modes of the rectangular waveguide are TE10 and TE20, respectively. Since these modes do not depend on the waveguide height, it is possible to reduce the height for these modes. Thus, the flat waveguide can be transversely folded once, which results in a quarter reduction in the cross-sectional area of the waveguide forming a compact structure. As shown in FIG. 2, the first two modes of a partial H-plane waveguide can have the same dispersion characteristics as those of a conventional rectangular waveguide, while its cross section is one quarter. Therefore, both conventional and compact waveguides can achieve the same usable bandwidth. These two modes can be separately controlled if required for different applications. This new type of compact waveguide brings up numerous possibilities to use this waveguide for microwave applications that have space and weight limitations.

The dispersion characteristics of the partial H-plane waveguides have been theoretically investigated by applying Galerkin's method in Fourier domain to obtain the propagation constant and, consequently, the fields in the structure. The E-field distributions of dominant mode of a conventional waveguide are the same as of the partial H-plane waveguide if it is unfolded with respect to the metal vane. Thus, a partial H-plane antenna can be constructed by using the same structure, broad wall longitudinal shunt slot, of a conventional slot antenna.

Figure 3:
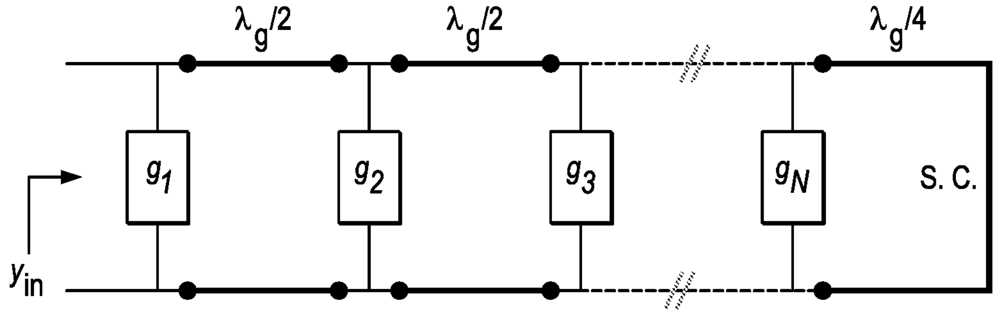
FIG. 3 shows an equivalent circuit model of resonant slotted waveguide antenna array with shunt conductances.

For a longitudinal shunt slot on a conventional waveguide, a model of the antenna may be constructed by considering the slots as shunt admittances linked by sections of ideal transmission lines, as shown in FIG. 3. The active admittance of each slot in the slot array, $Y^a$, in the equivalent model usually includes both the self-impedance, $Y_n$, and the effect of the mutual coupling with the remaining slots. The procedure for the design of a linear array of longitudinal slots fed by rectangular waveguide has been shown previously in one version to rest on two design equations. The first, Equation (3) where Equations (4) and (5) define variables of Equation (3), and the second, Equation (6), where $Y_s$ is the admittance of the slot, $G_0$ is the characteristic conductance of the waveguide, $x_0$ is the slot offset, $V_s$ is the slot voltage, $V_n$ is the modal voltage at $Y_s$, and 2L is the slot length.

$$\frac{Y_s}{G_0} = -K_1 f(x_0, L)\left(\frac{V_s}{V_n}\right) \tag{3}$$

$$K_1 = -2\sqrt{\frac{Y_i}{G_0}}\,\frac{j\pi\sqrt{2}}{\beta_{10}k_0 a\sqrt{ab}} \tag{4}$$

$$f(x_0, L) = -\frac{\frac{\pi}{2kL}\cos(\beta_{10}L)}{\left(\frac{\pi}{2kL}\right)^2 - \left(\frac{\beta_{10}}{k}\right)^2}\cos\left(\frac{\pi x_0}{a}\right) \tag{5}$$

$$\frac{Y^a}{G_0} = \frac{2}{\frac{2}{\frac{Y_s}{G_0}} + \frac{1}{\Gamma}\frac{V_{scoupl}}{V_s}} \tag{6}$$

The design equations are solved iteratively. Further details regarding the iterative design algorithm for standing wave arrays are shown in Robert S. Elliott, "An Improved Design Procedure for Small Arrays of Shunt Slots," IEEE Transactions on Antennas and Propagation, Vol. AP-31, No. 1, pp. 48-53, 1983, which is incorporated by reference. The aim of the design procedure is to determine the length and offset of each slot in such a way as to achieve the desired voltage distribution on the different slots.

Figure 4:
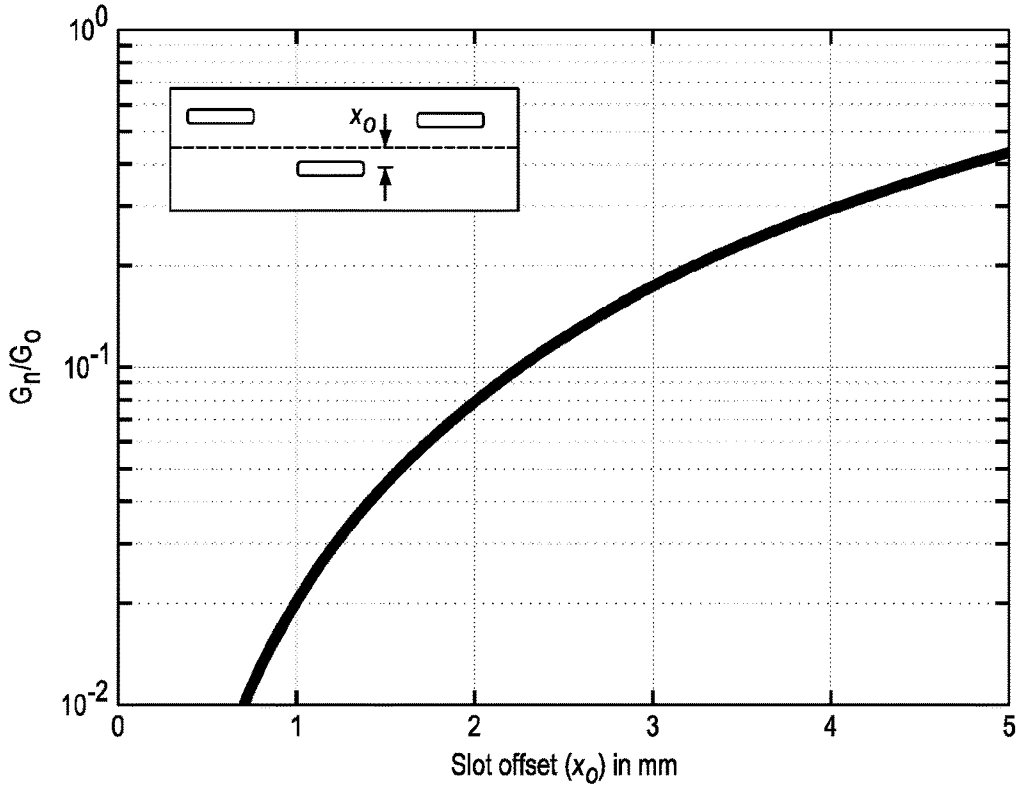
FIG. 4 shows a normalized resonant conductance $g_n(x_0)$ vs. slot offset $x_0$ of isolated longitudinal shunt slot in a WR-90 standard (with a=22.86 mm and b=10.16 mm) at 9.4 GHz.

A formula, shown as Equation (7), was derived by A. F. Stevenson, "Theory of Slots in Rectangular Waveguides," Journal of Applied Physics, Vol. 19, No. 1, pp. 24-38, 1948, which is incorporated by reference, for the normalized resonant conductance of a single longitudinal slot as a function of its offset $x_0$ from the centerline. In Equation (7), $G_s$ is the conductance of the slot. Equation (7) indicates that the normalized conductance of the longitudinal slot in the broad wall of a rectangular waveguide is offset dependent, as shown in FIG. 4 using a WR-90 standard at 9.4 GHz. It is shown that by adjusting the slot offset from the center line of the waveguide, the slot conductance can be controlled and then the slot excitation.

$$\frac{G_s}{G_0} = 2.09\frac{a/b}{\beta/k}\cos^2\left(\frac{\beta\pi}{k}\right)\sin^2\left(\frac{\pi x_0}{a}\right) \tag{7}$$

The design of the partial H-plane slot array antenna is described below. The structure of a 1-D resonant slot array antenna using partial H-plane waveguide, as constructed in accordance with the present disclosure, is shown in FIG. 6. The slot length is nearly $0.5\lambda_o$, and its width is assumed to be very small. To be excited in phase for all slots, the array with slots spaced $0.5\lambda_g$ apart and with alternating slots on the opposite side of the center line is employed. The designed array follows the uniform array with a side lobe level (SLL) of 13.26 dB, and the operation frequency is 9.4 GHz. The slot offsets of $x_n$s, which control the conductance and excitation level of each slot, are determined from Equation (7). The designed parameters are listed in Table 2. The thickness and width of each slot resonant array antenna is 1.27 mm and 1.533 mm, respectively. The thickness ($d_4$) and length ($d_7$) of the metal vane are set to be 0.5 mm and 9.5 mm, respectively. The longitudinal slot is cut in the narrow wall of the partial H-pane waveguide parallel to the waveguide with an offset $x_n$=2 mm from the center line. The polarization is perpendicular to the waveguide axis. The excitation is controlled mainly by the offset. It is the maximum at the edges and zero at the center. In order to radiate in the boresight, the longitudinal slot antennas are arrayed by a spacing of a half-guided wavelength, and the offset direction is opposite among the adjacent slots.

Partial H-plane waveguide to coaxial adapter is used where a probe was inserted into a rectangular cut-out in the H-plane vane at the center of waveguide structure. The adapter was optimized using a commercial full wave simulator, specifically a high-frequency structure simulator (HFSS), where the cut-out width and depth were optimized to maximize the return losses.

TABLE 2

Summary of the dimensions of VP and HP linear slotted waveguide antenna arrays.
The HP Linear Array

| | Cross section (mm × mm) | Frequency (GHz) | Slot (mm) | | | | | | Iris dimensions (mm) | | |
|---|---|---|---|---|---|---|---|---|---|---|---|
| | a × b | $f_o$ | $l_o$ | $w_b$ | $t_b$ | $h_s$ | $x_n$ | $l_g$ | dx | dy | dz |
| H-pol | 22.68 × 10.16 | 9.4 | — | 1.533 | 1.27 | 3.75 | — | 22.2704 | 2.5 | 2.5 | 6.5 |
| V-pol | 11.43 × 6 | 9.4 | 15.4 | 1.533 | 1.27 | — | 2 | 22.2704 | — | — | — |

The second commonly used slot array antenna is the edge slot waveguide antenna array which has slots modified in a sidewall of the waveguide to a beam pattern in H-plane. For an edge slot antenna, to obtain the desired shunt conductance value which is determined by a tilted angle of sidewall slot, the slot is cut into the sidewall and wrapped around the broad wall of the waveguide because the height of a sidewall of the conventional waveguide is usually smaller than the resonant length of the slot. Each slot is approximately one half-wavelength long and is spaced by a half guide wavelength from its adjacent slots at the design frequency if a standing wave feed is used to obtain a radiating element of in-phase. In order to excite each slot with in-phase spaced by half a wavelength, the adjacent edge slots in the sidewall are oppositely inclined with respect to the vertical centerline.

Stevenson, 1948 (op. cit.) derived the values of the resonant conductance, normalized to the waveguide impedance, for a slot in the narrow wall of the rectangular waveguide using transmission-line theory and the waveguide modal Green's functions. The conductance of narrow-wall (edge) shunt slot is given by Equation (8), where $\theta_{in}$ is the inclined angle of the slot relative to the vertical direction 'b'.

$$\frac{G_s}{G_0} = \frac{30}{73\pi}\frac{\lambda_g}{\lambda_o}\frac{\lambda_o^4}{a^3 b}\left(\frac{\sin\theta_{in}\cos\left(\frac{\pi\lambda_o}{2\lambda_g}\sin\theta_{in}\right)}{1-\left(\frac{\lambda_o}{\lambda_g}\right)^2\sin^2\theta_{in}}\right)^2 \quad (8)$$

Figure 5:
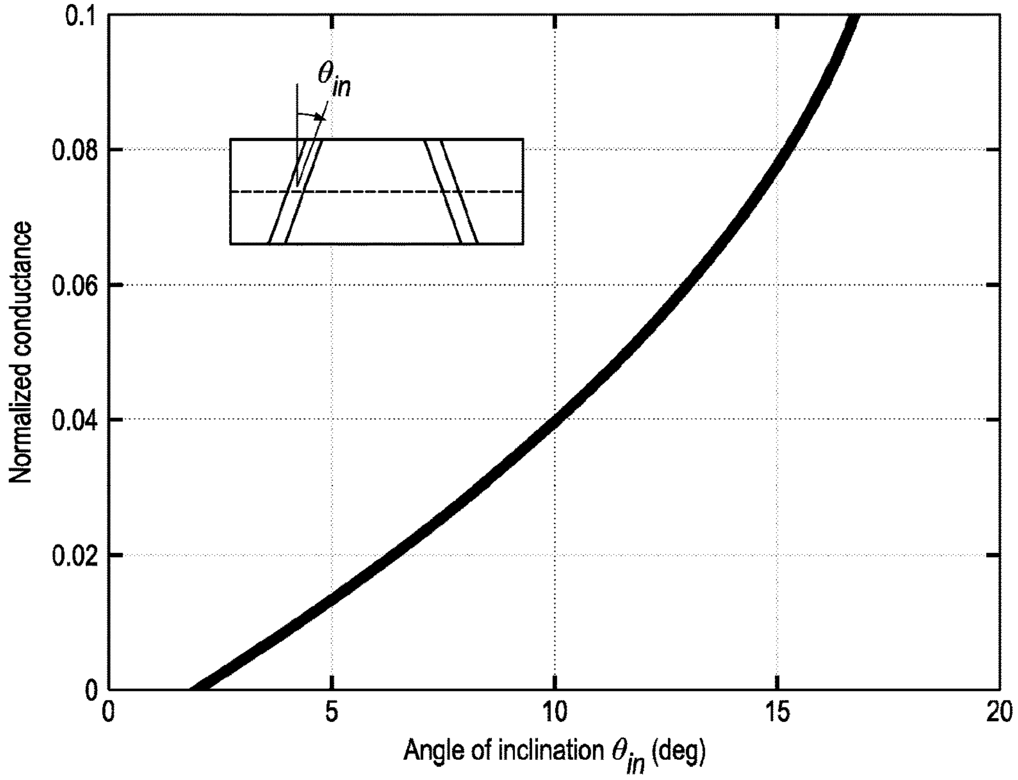
FIG. 5 shows the variation of the normalized conductance with the angle of inclination of shunt slot in the narrow wall of a WR-90 with a=22.86 mm and b=10.16 mm at 9.4 GHz.

As shown in FIG. 5, with increasing the inclination angle, the slot conductance in the narrow wall of the WR-90 waveguide increases. The reason for the inclination is that the non-inclined slot disrupts a negligible current in the narrow wall of the waveguide when TE10 dominant mode propagates inside the waveguide. Consequently, the slot will not radiate because a very weak electric field is excited in the slot. However, the inclined slot does interrupt the wall current by an amount controlled by the slot tilt. Unfortunately, the excitation technique applied to the edge wall slots using the inclination has some drawbacks. In addition to the desired longitudinally polarized electric field, the inclination produces a vertically polarized electric field, which is often undesirable. The presence of the unwanted polarization increases the cross-polarization levels.

Figure 6B:
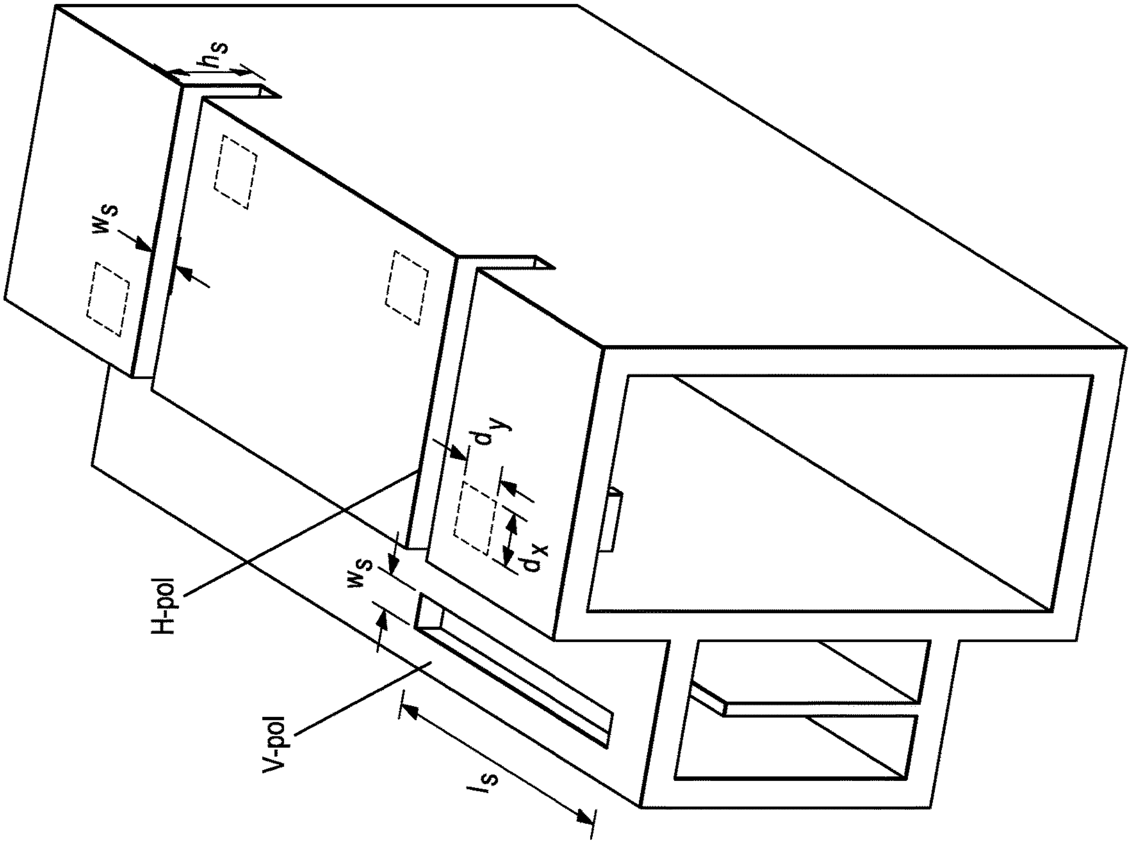
FIGS. 6A-6B show the geometry of a compact dual-polarized slotted waveguide antenna unit cell constructed in accordance with the present disclosure.
Figure 6A:
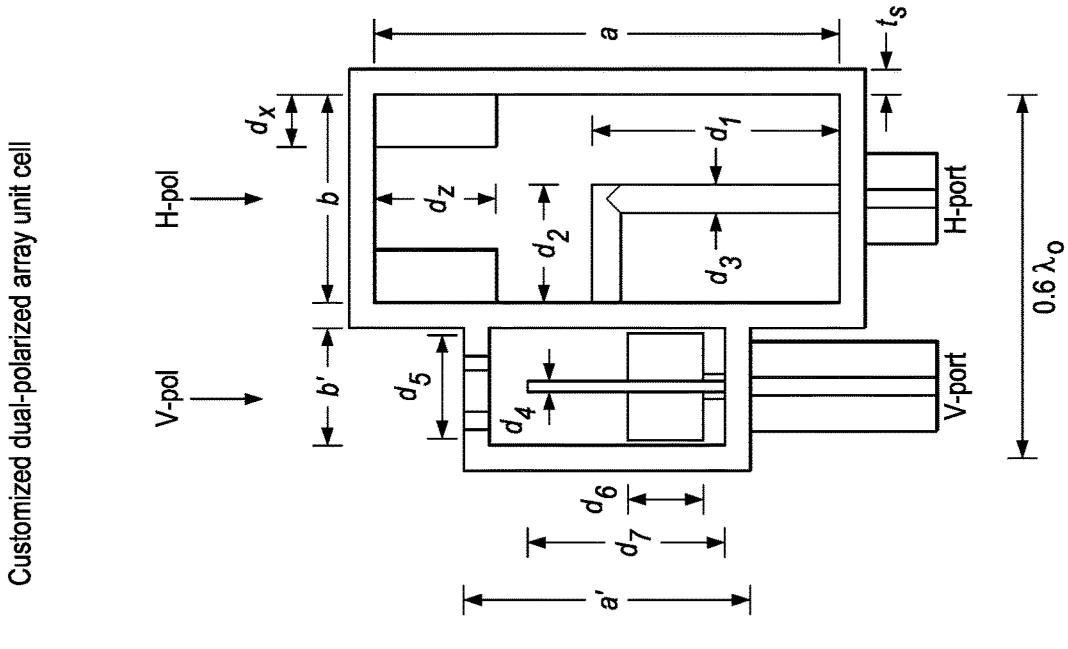

Non-inclined narrow-wall slots in waveguide generate the horizontal polarization with suppressed cross-polarization. The slots have to extend into the neighboring broad walls of the waveguide to be resonant. The edge slots in the narrow wall need to be excited with a pair of wires inside the waveguide and not by slot tilt in order for minimum cross polarization generation. The excitation of the edge slots is controlled by the iris dimensions and location. As noted above, the structure of the 1-D resonant slot array antenna using non-inclined narrow-wall slots is shown in FIGS. 6A-6B.

The design of a linear slotted waveguide array antenna begins by determining the aperture distribution, and hence the slot excitation, required to achieve the beamwidth, gain, and side lobe level needed at the center frequency. The square of the voltage excitation of a slot is proportional to its radiated power and its resonant conductance. The resonant normalized conductance $g_n$ of the nth slot, for a given aperture voltage distribution, is given by Equation (9) where, N is the number of slots in a linear array, and $a_n$ is the voltage excitation for the nth slot. For the uniform illumination, $g_n$=1/N.

$$g_n = \frac{a_n^2}{\sum_{i=1}^{N} a_i^2} \quad (9)$$

Once the slot conductance is obtained based on its voltage excitation, the slot placement and orientation can be calculated using Equations (3)-(8). The dimensions of the exemplary customized dual-polarized array unit cell shown in FIG. 6 are shown in Table 2 and Table 4, but are not to be limited to those. For example, the value of any given variable shown in Tables 2 and 4 can be increased by 50% or more, or can be reduced by 50% or more, as long as the resulting configuration functions, and is structured in accordance with the limitations and the characteristics of the apparatus disclosed herein.

Figure 7A:
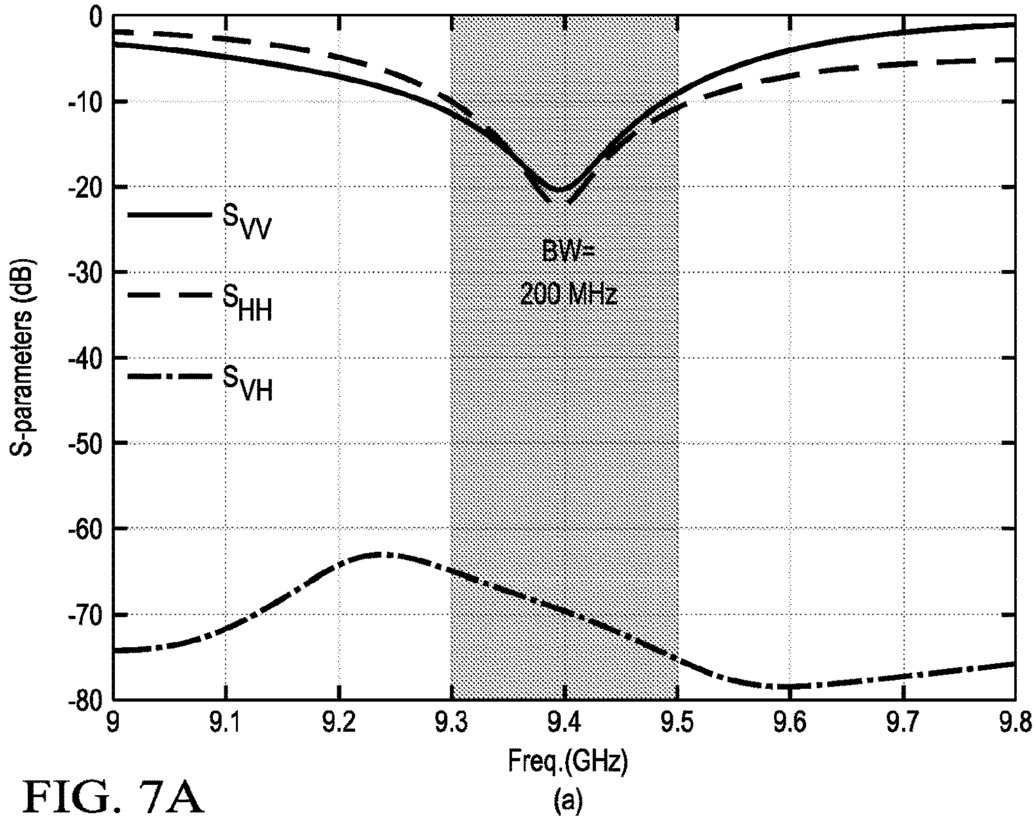
FIG. 7A shows S-parameter values of the novel dual-polarization antenna.
Figure 7B:
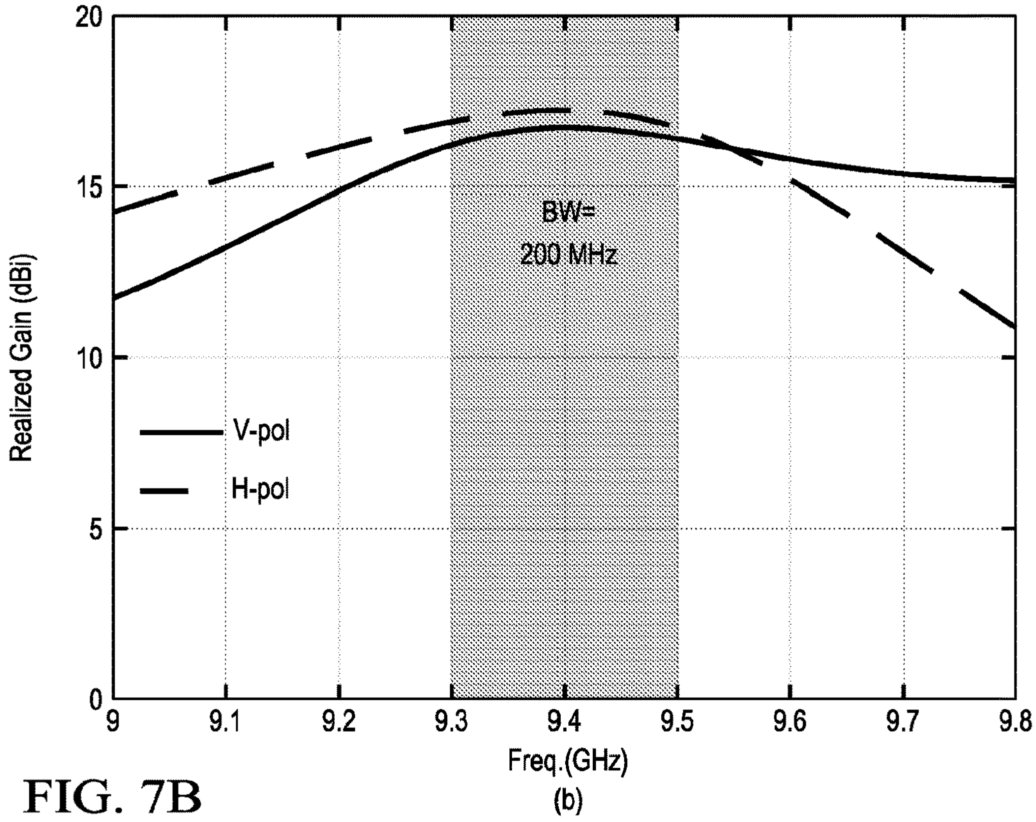
FIG. 7B shows realized gain values verses the frequency for VP antenna and HP antenna.

Performance of the antenna unit cell (8-slot linear array) was analyzed using High-Frequency Structure Simulator (HFSS). The S-parameters and gain of the basic unit of both VP and HP are depicted in FIGS. 7A-7B. The reflection coefficients of the VP and HP units are lower than −10 dB over the frequency range from 9.3 GHz to 9.5 GHz. The bandwidth for |Svv| (or |Shh|) <−10 dB is about 2.3% (9.3-9.5 GHz). The isolation (|Shv|) between the V and H ports of the antenna is higher than 60 dB. The realized gain versus the frequency is exhibited in FIG. 7B. It is shown that the variation of gain for both polarizations over the frequency bandwidth is about 0.5 dB.

Figure 7C:
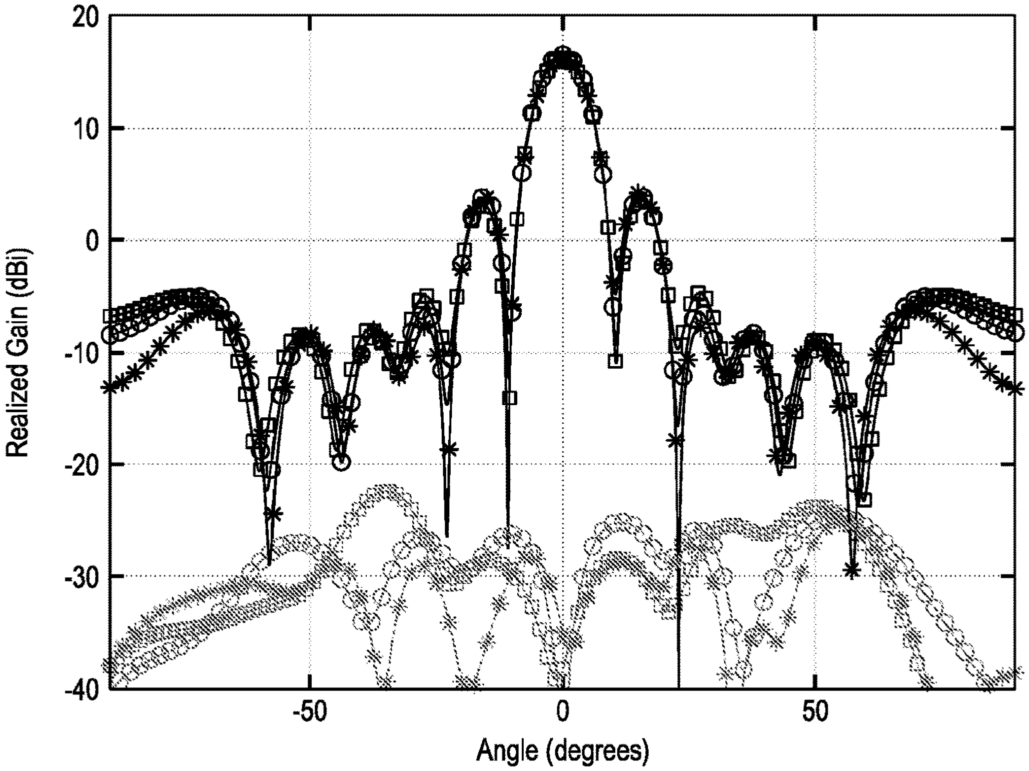
FIG. 7C shows co- and cross-polarization gain radiation patterns at 9.3 GHz, 9.4 GHz and 9.5 GHz of an HP antenna in the E-plane.
Figure 7D:
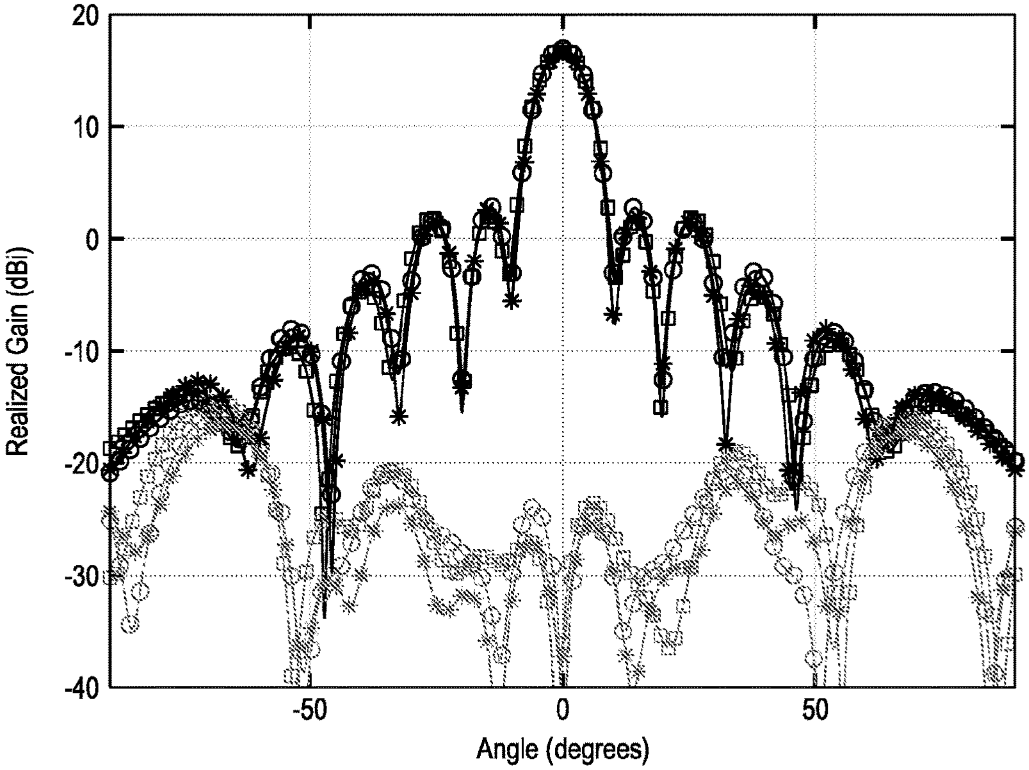
FIG. 7D shows co- and cross-polarization gain radiation patterns at 9.3 GHz, 9.4 GHz and 9.5 GHz of a VP antenna in the H-plane.

FIGS. 7C-7D show the co-polarized and cross-polarized radiation patterns of several frequencies in the band (9.3 GHz, 9.4 GHz and 9.5 GHz) in elevation plane (along the waveguide axis) of a conventional antenna and a compact antenna, respectively. It is observed that the radiation patterns of both antennas are stable over the frequency band. The maximum SLL is −13 dB with cross-polarization level of −60 dB below the main lobe for HP and VP array. Performance comparison of the linear array antenna for both polarizations (H and V) is summarized in Table 3.

TABLE 3

Radiation parameters of the dual-polarization slotted waveguide antenna array with eight slots. Planar Dual-Polarized Antenna Array

| Type | Bandwidth (%) | Gain (dBi) | SLL (dB) | Cross-polarization level (dB) |
|---|---|---|---|---|
| Conventional antenna (H-pol) | 2.23 | 16.72 | 12.96 | −60 |
| Compact antenna (V-pol) | 2.29 | 17.23 | 14.65 | −60 |

Figure 8A:
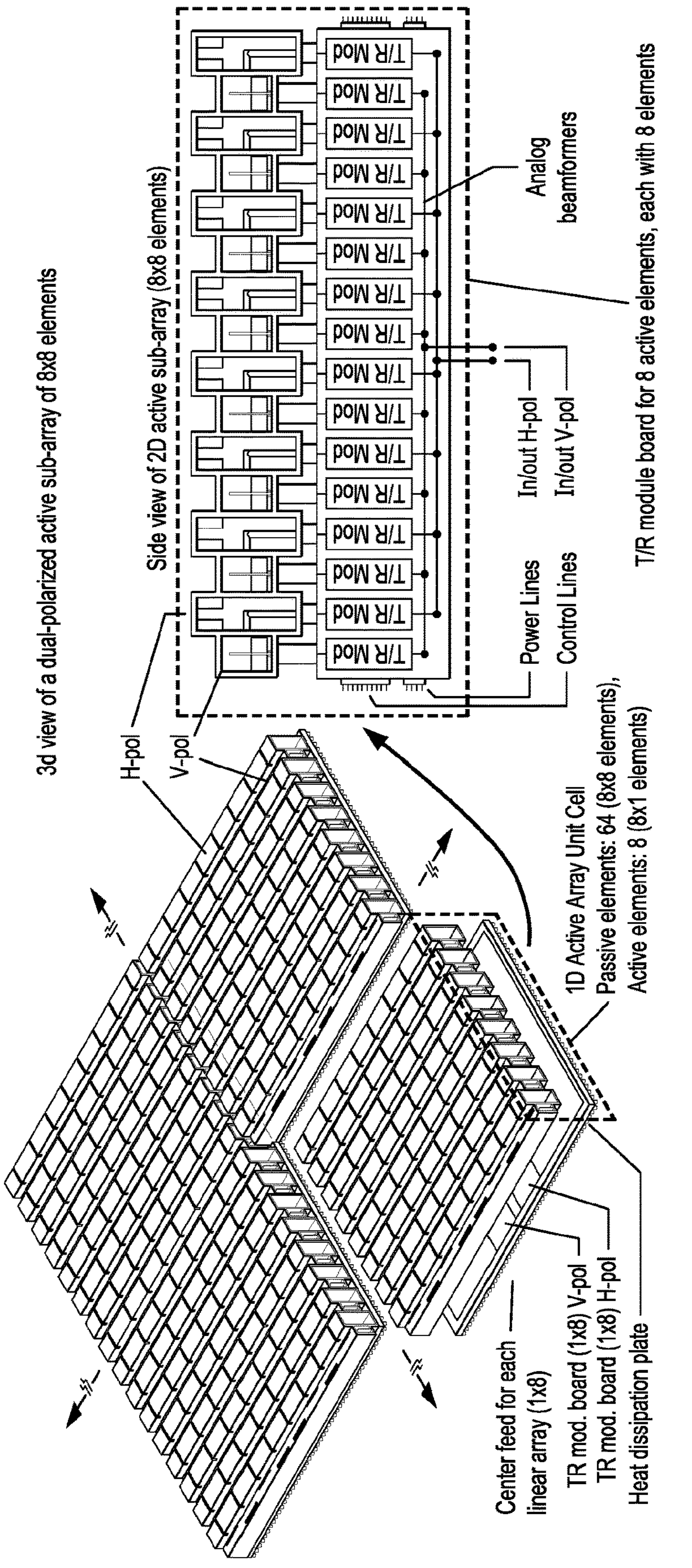
FIG. 8A shows the geometry of one embodiment of the novel active dual-polarized planar SWGA array. The left side of FIG. 8A is a 3D perspective view of the feeding structure, and the right side of FIG. 8A is a side elevational view of the feeding structure.

A non-limiting example of a structure of a dual-polarization planar SWGA array constructed with the novel unit cells of the present disclosure is shown in FIG. 8A. With the VP and HP linear arrays successfully designed using HFSS, the dual-polarization planar antenna is composed of an 8×8 VP sub-array and an 8×HP sub-array. When the vertical polarization linear array is designed, the effect of the horizontal polarization array is considered, and vice versa. Both waveguides used for the VP and HP linear arrays have the same guide wavelength, thus both antennas have the same length. In the back, at the centers of the linear array, 50Ω probe adapters for both polarizations are arranged. It is arranged with HP and VP waveguide array side by side, eight linear array for each (FIG. 8A), in which the HP waveguide linear arrays are higher than the VP waveguide linear arrays. The width of two linear arrays together is up to $0.58\lambda_o$ in order to obtain a ±42° beam scanning.

Figure 8B:
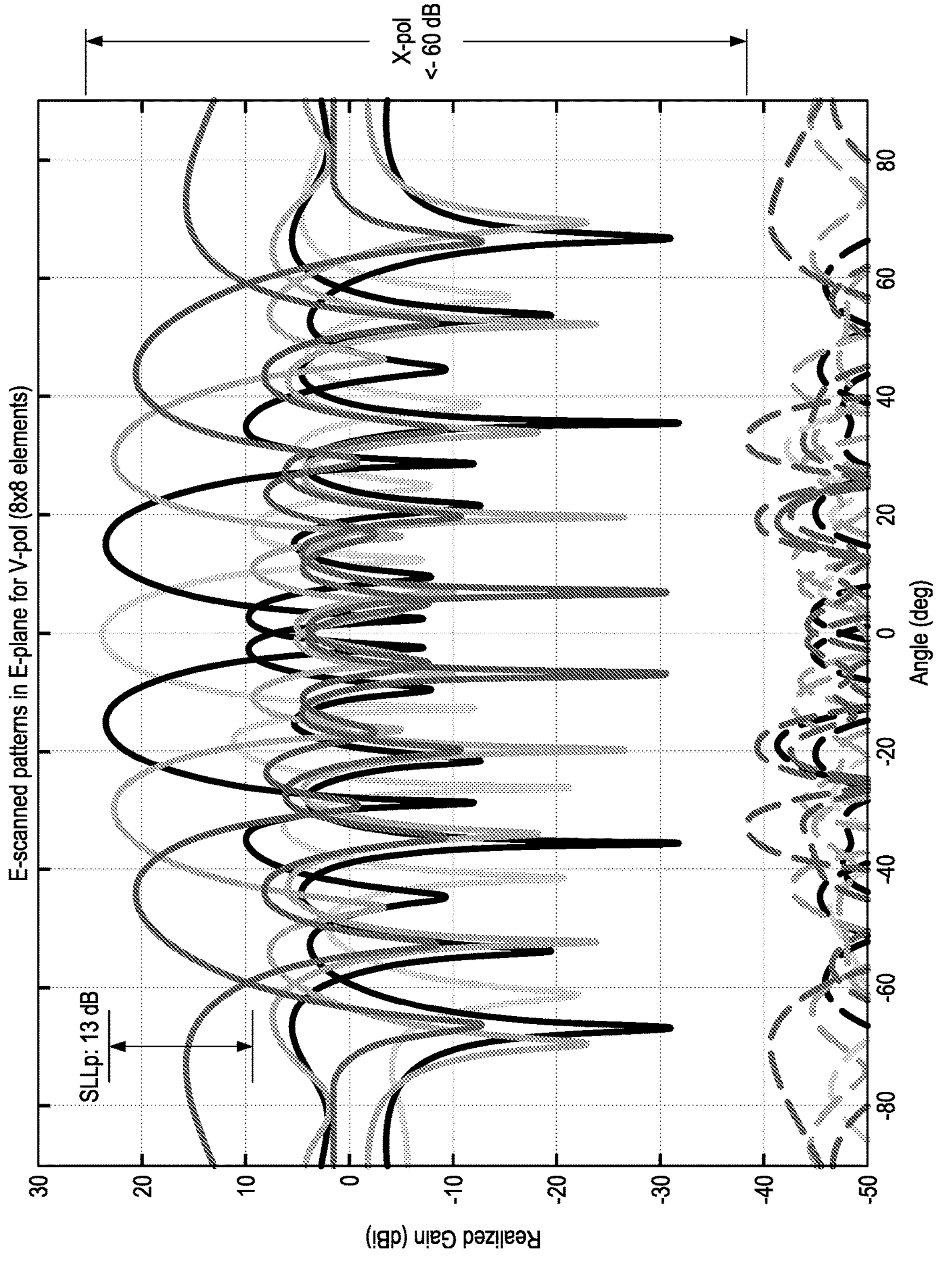
FIG. 8B shows simulated co- and cross-polarization patterns scanning characteristics at 9.4 GHz at various scan angles $\theta_s$=±0°, ±15°, ±30°, ±45° in the E-plane of VP antenna with uniform illumination.
Figure 8C:
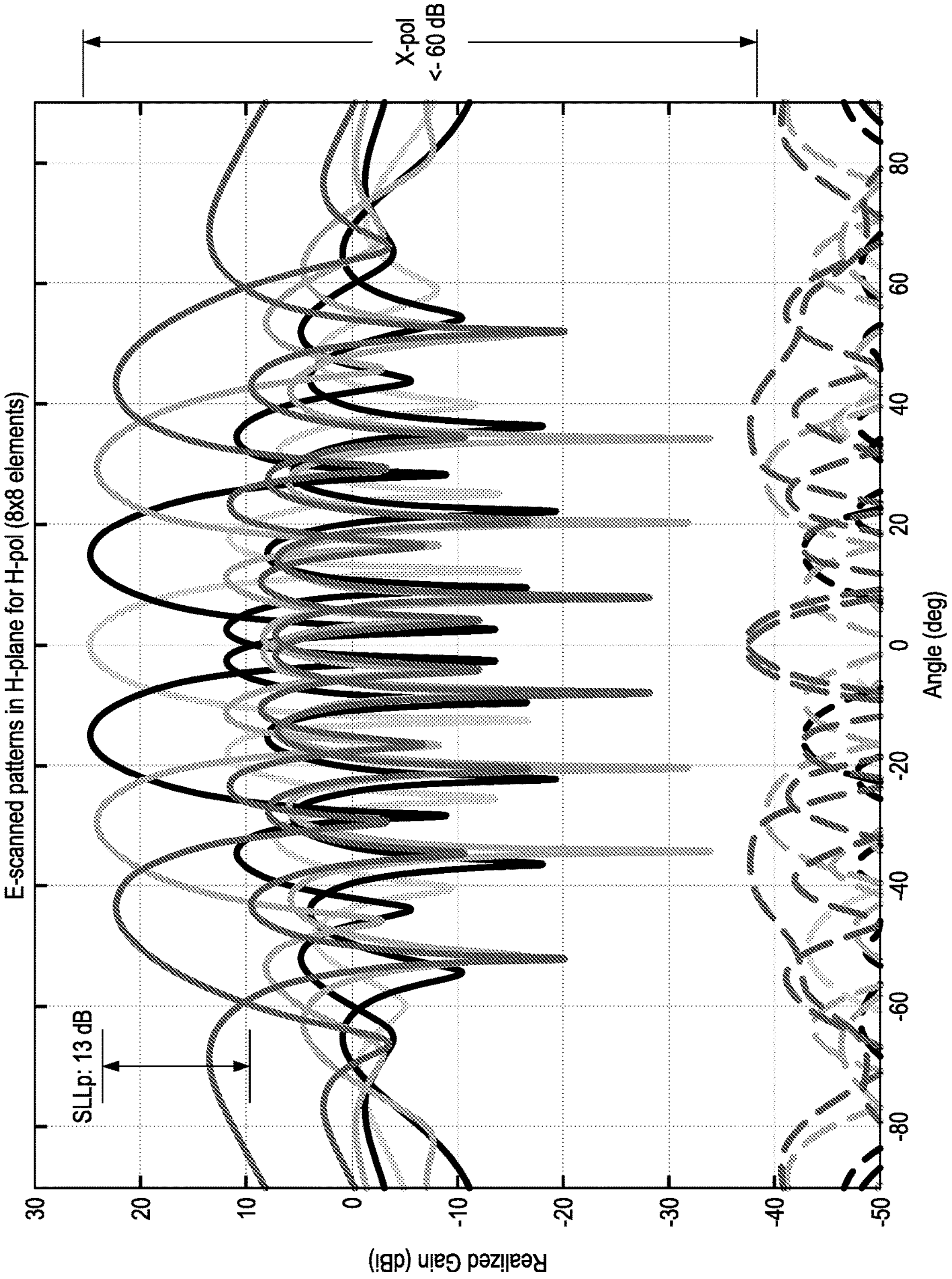
FIG. 8C shows simulated co- and cross-polarization patterns scanning characteristics at 9.4 GHz at various scan angles $\theta_s$=±0°, ±15°, ±30°, ±45° in the H-plane of HP antenna with uniform illumination.
Figure 8D:
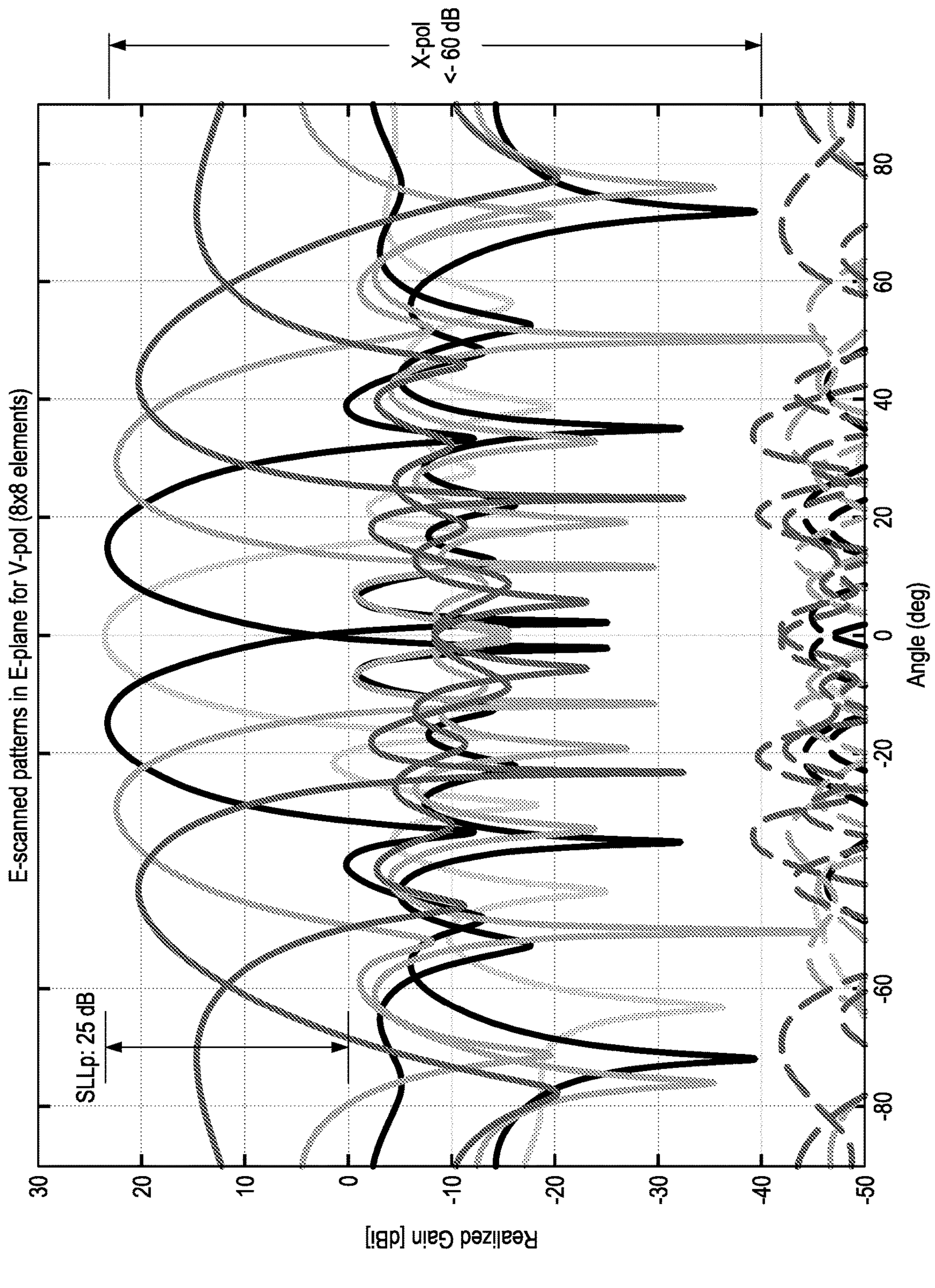
FIG. 8D shows simulated co- and cross-polarization patterns scanning characteristics at 9.4 GHz at various scan angles $\theta_s$=±0°, ±15°, ±30°, ±45° in the E-plane of VP antenna with tapered illumination.
Figure 8E:
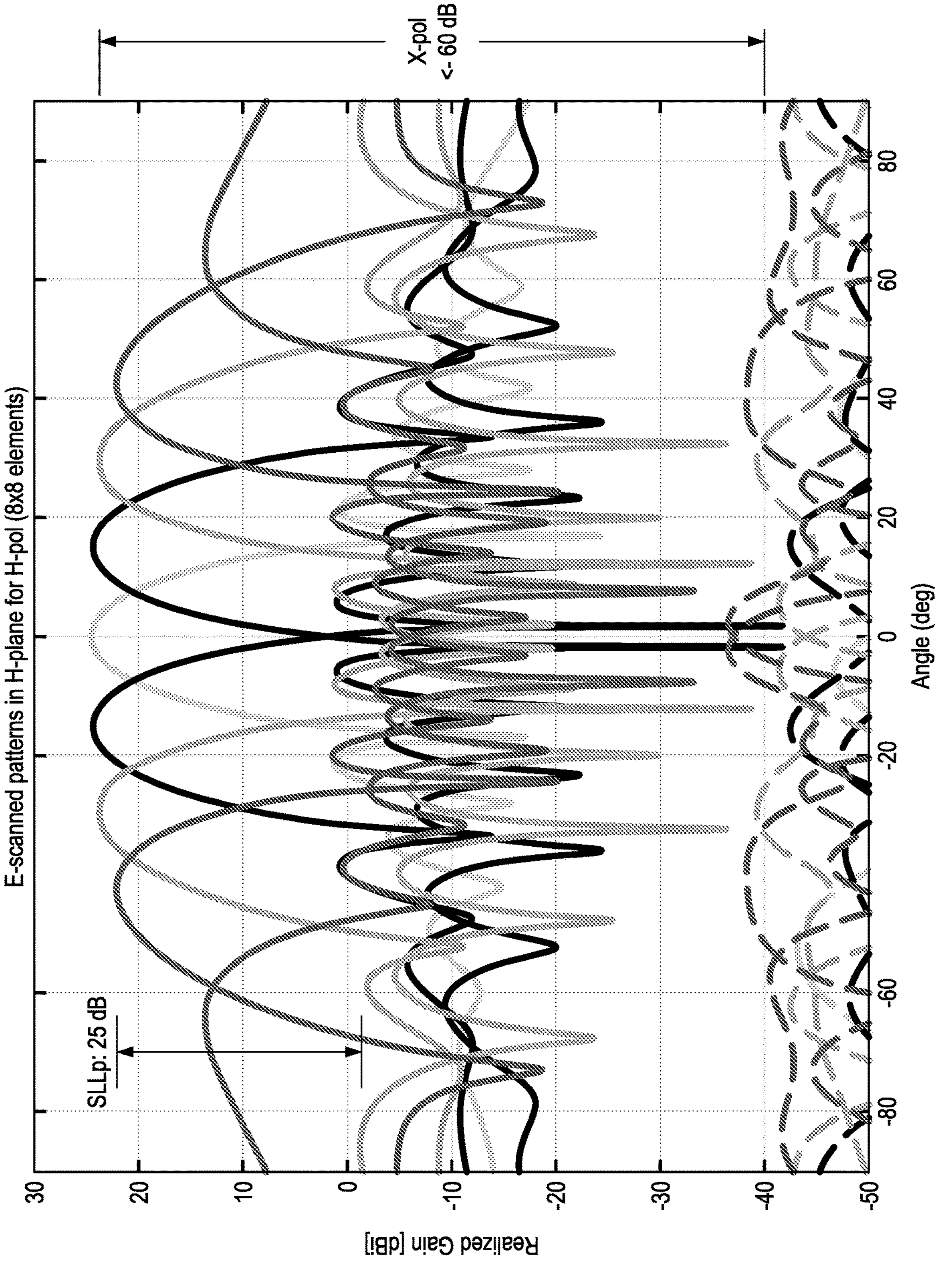
FIG. 8E shows simulated co- and cross-polarization patterns scanning characteristics at 9.4 GHz at various scan angles $\theta_s$=±0°, ±15°, ±30°, ±45° in the H-plane of HP antenna with tapered illumination.

Simulated radiation pattern scanning performances of the disclosed planar array for both polarizations in the azimuth plane perpendicular to the waveguide axis at 9.4 GHz with uniform illumination are shown in FIG. 8B for the VP, and in FIG. 8C for the HP. The main beam direction can scan from −45° to +45° with a step of 15°. At the maximum scanning angle of ±45° in the E-plane of the VP antenna, the gain decreases by 3.2 dB, meanwhile the side lobe degradation is 1 dB. However, in the H-plane of the HP antenna, the gain decreases 2.6 dB and the side lobe degradation is 1.0 dB when the scanning angle reaches ±45°. Another advantage of this design configuration is a high polarization purity in all scanning angles with the cross-polarization level below −60 dB in the main beam directions. We can also observe that the side lobe levels in all scanning angles are lower than 13 dB. The array also enables individual excitation for each 1×8 element sub-array. Amplitude tapering can be applied using a 6-bit attenuator. Side lobe reduction using a Taylor 25 dB ($\bar{n}$=3) amplitude distribution, and the radiation pattern scanning performances of the disclosed planar array for VP and HP in the azimuth plane perpendicular to the waveguide axis at 9.4 GHz are depicted in FIGS. 8D-8E. For both VP and HP, the main beam is scanned from −45° to +45° with a step of 15°. At the maximum scanning angle of ±45° in the E-plane of the VP antenna, the gain decreases by 3.2 dB, meanwhile the sidelobe degradation is 1 dB. However, in the H-plane of the HP antenna, the gain decreases by 2.6 dB and the side lobe degradation is 1.0 dB when the scanning angle reaches ±45°. It can be seen that the maximum SLL is −24.5 dB with cross-polarization level of −60 dB below the main lobe for HP array. The maximum SLL is −25 dB with cross-polarization level of −60 dB below the main lobe for VP array. In order to design a dual polarization slotted waveguide array antenna with low SLL, a tapering amplitude distribution is required. The desired amplitude distribution is a two parameter Taylor distribution with 8 elements, ñ=3 and side lobe level of −25 dB. The definition of the parameter ñ and the details of the Taylor distribution can be found in Constantine A. Balanis, "Antenna Theory: Analysis and Design, Fourth Edition, 2016," which is incorporated by reference.

Figure 9:
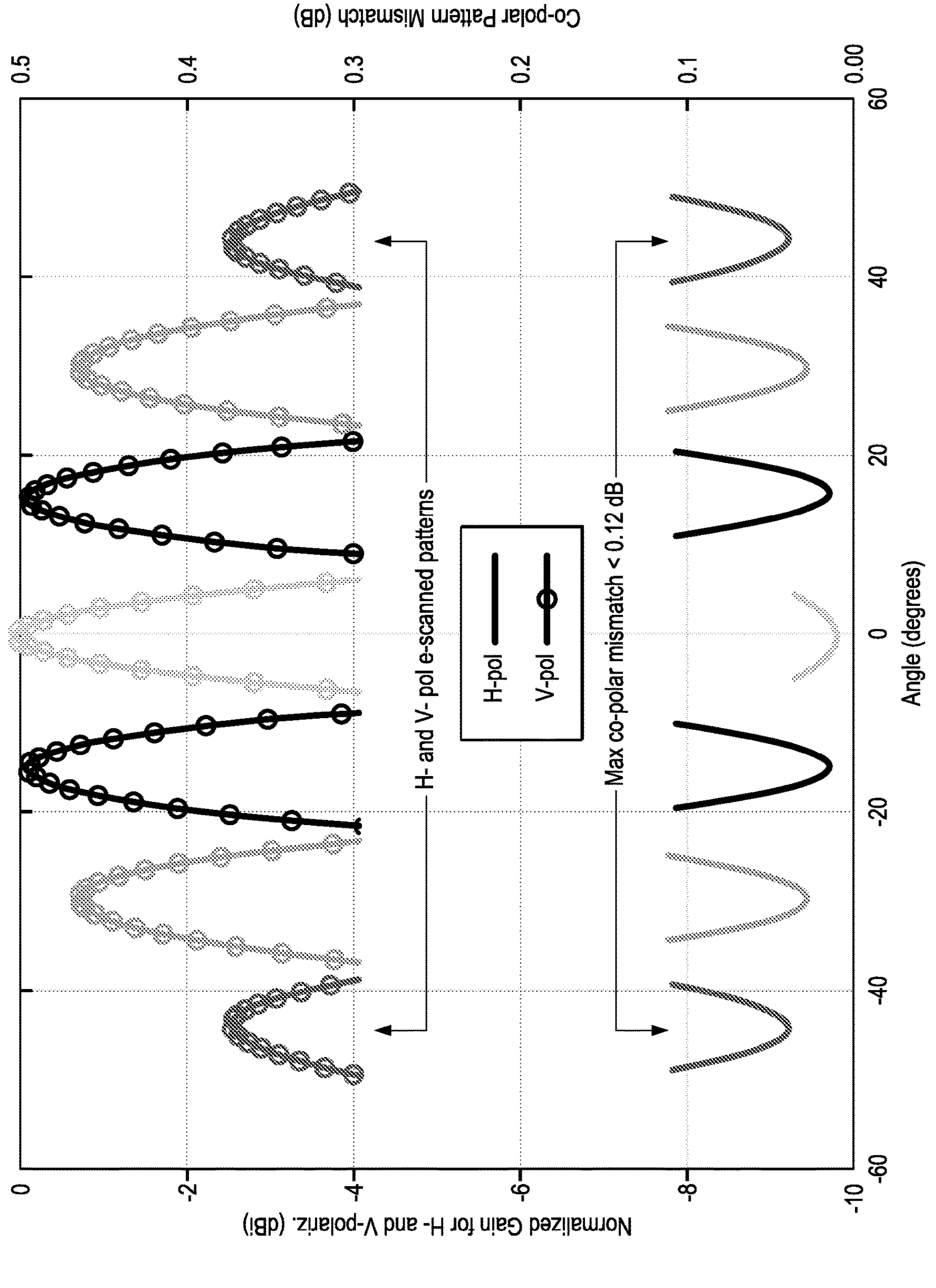
FIG. 9 shows simulated co-polar patterns of mismatch at 9.4 GHz with uniform illumination at various scan angles $\theta_s$=±0°, ±15°, ±30°, ±45°.

FIG. 9 illustrates the overlapped normalized e-scanned gain of the 8×8 array antenna at 9.4 GHz. Mismatched co-polar beam patterns and cross-polarization isolation are key metric parameters for dual-polarized radars used in weather applications. Typically, cross-polarization isolation below −40 dB, and less than ±0.2 dB is the maximum tolerable mismatch between HP and VP. Using the novel design disclosed herein the cross-polarization below −60 dB across and a co-polar mismatch below ±0.12 dB was obtained over a scanning range of 84° (±42°).

The array unit cell of 8×8 elements can be easily integrated with active modules for 1D e-scanning capability. This active array can be used to create a large aperture array for 2°×2° antenna beamwidth. Conventional or customized electronics using GaAs or GaN can be used for the front-end controller (FEC), where power levels from 1 to 20 Watts per 8-element sub-array can be easily obtained. Radio-frequency complementary metal-oxide-semiconductor (RF-CMOS) technology is commercially available for control modules (CMs). CMOS technology enables high integration of 7-bit digital phase shifter, 7-bit digital attenuators, high isolation T/R and polarization switches and gain blocks. The SWGA arrays and radar systems disclosed herein are very attractive for airborne and weather radar applications that require 1D e-scanning beam patterns, high power, high polarization purity, and lower costs.

Feeding Technique and Structure

Standard rectangular waveguides are generally used as transmission lines for high power applications. Like other transmission lines, these waveguides have a characteristic impedance which requires matching for maximum power transfer. Therefore, there is a need for an adapter between 50Ω coaxial cables and the rectangular waveguides, a so-called coax-to-waveguide adapter. This adapter will introduce the coaxial cable mode to the rectangular waveguide mode. Coupling loops and probes are common ways to inject or remove a microwave signal to the waveguide. The probes couple to an electric field of a certain mode inside the waveguide and the loops couple to a magnetic field of the same mode, but both an electric and a magnetic field will be set up in each case because the two are inseparable. The majority of commercially available coax-to-waveguide adapters are monopole probes. Resonantly-fed SWGA arrays have a long history of use. The end feed and center feed are the most common ways to feed the one-dimensional slotted waveguide antenna arrays with standing-wave excitation. In the end feed configuration, the waveguide antenna array is fed from one end of the waveguide and terminated by a short circuit at the other end. The feed needs to be positioned at odd multiples of $\lambda_g/4$ or $\lambda_g/8$ at the center frequency from the waveguide feeding end and the short circuit is $\lambda_g/4$ away from the end slot. The normalized conductance of the end-fed slotted waveguide antenna arrays for the matching conditions at the feed is given by Equation (10), where N is the number of slots in the waveguide, and $g_n$ is the normalized conductance of the slot n.

$$\sum_{n=1}^{N} g_n = 1 \tag{10}$$

The center feed is another popular way to feed the one-dimensional slotted waveguide antenna arrays where the antenna waveguide is fed from the center and is terminated by short circuits $\lambda_g/4$ away from both end slots. A center feed configuration is introduced to enhance the bandwidth as well as to suppress the frequency dependent beam squinting. In addition, a more compact antenna system with symmetrical radiation patterns is obtained. Similarly, the matching condition at the feed is given by Equation (11).

$$\sum_{n=1}^{N} g_n = 2 \tag{11}$$

In the present disclosure, in at least one non-limiting embodiment, the center feed configuration has been selected to feed both conventional and partial H-plane waveguides. For the VP waveguide antenna, the slotted partial H-plane waveguide is used. A coaxial to partial H-plane waveguide adapter with a conducting disc attached to the end of the probe is used where a probe was inserted into a rectangular cut-out in the H-plane vane at the center of the waveguide. And a hole is drilled in the bottom wall of the waveguide to insert the probe into the waveguide. The diameter $d_p$ and length $l_p$ of the probe, the diameter $d_5$ and thickness $d_6$ of the disc, and the rectangular cut dimensions $w_c$, $h_c$ will influence the impedance matching between the coaxial transmission line and the partial H-plane waveguide. The transition structure was designed using a commercial HFSS simulator to realize the input impedance requirements. The obtained values of all parameters are presented in Table 4.

TABLE 4

Summary of the dimensions of HP and VP feeding structures

| H-pol | L-shape probe (mm) | | | |
|---|---|---|---|---|
| | $d_3$ | $d_1$ | $d_3$ | $d_2$ |
| | 1.27 | 11.43 | 1.27 | 5.08 |

| V-pol | Disc-shape probe (mm) | | | | | |
|---|---|---|---|---|---|---|
| | $d_p$ | $l_p$ | $d_5$ | $d_6$ | $w_c$ | $h_c$ |
| | 1.27 | 1 | 5.5 | 3.25 | 8 | 4.25 |

For the HP waveguide antenna, L-loop side launcher coaxial-to-waveguide transition is used to inject energy into a waveguide by setting up an H-field in the waveguide. By L-shape loop coupling in a rectangular waveguide first an H-field is produced which causes an E-field. A hole is drilled in the narrow wall of the waveguide to insert the probe into the waveguide and the L-loop is formed by soldering the coaxial probe onto the broad wall of the waveguide and is used to generate a current loop, then the current loop becomes a proper excitation for the magnetic field of the dominant TE10 mode. A simple L-shape transition structure was designed using a commercial HFSS simulator to realize the input impedance requirements. The obtained values of all parameters are presented in Table 4.

As depicted in Table 5, the presently disclosed ultra-compact high-performance waveguide antenna array is compared with previous customized waveguide structures shown in Jeffrey B. Knorr, "Analysis of Performance Characteristics of the Naval Postgraduate School MWR-05XP Mobile Weather Radar," December 2005 ("Knorr"/"Ref [7]"), and Ming Chen, et al., "Dual-Band Dual-Polarized Waveguide Slot Antenna Array for SAR Applications," IEEE Antennas and Wireless Propagation Letters, Vol. 19, No. 10, Aug. 7, 2020 ("Chen"/"Ref [10]"), which are incorporated by reference. The waveguide of the present disclosure has improved cross-polarization isolation and large scanning range. This is due to less element spacing of the disclosed structure. In addition, the disclosed design discussed about the co-polarization mismatch (<−0.12 dB), which is the critical parameter for dual polarized applications. The only trade-off of the disclosed structure is the narrow bandwidth as compared to that of Knorr.

TABLE 5

Comparison of previous and presently disclosed systems*.

| Parameters | Ref [7] | Ref [10] | This work |
|---|---|---|---|
| Frequency band | X-band | L-, C-band | X-band |
| Bandwidth (MHz) | 300 | 200 | 200 |
| Waveguide types | Partially customized | Folly customized | Standard (0.7λo) Customized (0.6λo) |
| Element spacing | 0.7λo | 0.7λo | 0.7λo 0.6λo |
| Max. scanning range | 40° (±20°) | 40° (±20°) | 84° (±42°) |
| Cross-pol isolation | <−40 dB | <−30 dB | <−60 dB |
| Max. co-pol mismatch | NA | NA | <0.12 dB |

The presently disclosed X-band dual polarized planar SWGA array design, in certain embodiments, provides high polarized isolation (within the range of about −60 dB to about −70 dB) over 200 MHz bandwidth and wide scanning performance 84°(±42°) in the azimuth plane, which are ideal for high-power dual-polarized radar systems for atmospheric applications. The system uses a compact array unit cell where the overall dimensions are reduced by 50% in comparison with that of a dual-polarization SWGA array which uses conventional rectangular waveguides. This presently disclosed design overcomes a fundamental limitation of electronically scanning with conventional waveguides, which have large element spacing ($1.2\lambda_o$). Reducing the element spacing to $0.6\lambda_o$ (in the azimuth plane), the present design uses the broad wall shunt slots for the VP antenna and non-inclined edge wall slots for the HP antenna. Results demonstrate 200 MHz bandwidth centered at 9.4 GHz (2.2% fractional bandwidth), in terms of radiation pattern and input impedance match. Side lobe level can be synthesized to obtained uniform and taper using the attenuators for each subarray (1×8 elements) in the azimuth plane. The polarization purity is excellent with a cross-polarization level below −60 dB at the boresight and scanned patterns up to at least ±45° or more. Reducing the element spacing to $0.6\lambda_o$ (in the azimuth plane), based on a partial H-plane waveguides, enables a 1D e-scanning range of, for example, 84°(±42°) in the azimuth plane. An active sub-array panel of 8×8 elements (unit cells), excited with 8 high-power transmit and receive modules are described. This active sub-array can be scaled to obtain a large array without any constraint in size and power.

In summary, in at least certain non-limiting embodiments, the present disclosure is directed to an X-band dual-polarized slotted waveguide antenna (SWGA) array unit cell which comprises a partial H-plane waveguide with a metal vane, and a conventional waveguide in a side-by-side arrangement, wherein the spacing between elements in the azimuth plane is in a range of about $0.6\lambda_o$ to about $0.5\lambda_o$, and having a one-dimensional (1D) electronic-scanning range of at least 84° (±42°) in the azimuth plane perpendicular to the waveguide axis, and having cross-polarization isolation of about −60 dB or less. The 1D electronic-scanning range may be within a range of 84° (±42°) to 180° (±90°), for example. The cross-polarization isolation may be in a range of about −60 dB to about −70 dB. In at least certain embodiments, the present disclosure is directed to a sub-array panel comprising a plurality of said X-band dual-polarized SWGA array unit cells. In certain embodiments, the plurality of unit cells in the sub-array panel is in a range of from 4 to 676, or a range of from 4 to 400, or in a range of from 4 to 256, or in a range of from 64 to 144. In certain embodiments, the sub-array panel may comprise $n^2$ unit cells arranged in an n×n configuration, where n is in a range of from 2 to 26, or in a range of from 4 to 16, or in a range of from 8 to 12. In at least certain embodiments, the present disclosure is directed to a radar array comprising a plurality of any one of the above-described sub-array panels claims, and to a method of using such a radar array for various well-known and conventional radar uses such as in monitoring weather or tracking moving objects.

What is claimed is:

1. An X-band dual-polarized slotted waveguide antenna (SWGA) array unit cell comprising:

a partial H-plane waveguide with a metal vane; and a conventional waveguide in a side-by-side arrangement with the partial H-plane waveguide, wherein a spacing between elements of the X-band dual-polarized SWGA array unit cell in an azimuth plane is in a range of about $0.6\lambda_o$ to about $0.5\lambda_o$, wherein the X-band dual-polarized SWGA array unit cell has a one-dimensional (1D) electronic-scanning range of at least 84° (±42°) in the azimuth plane perpendicular to a waveguide axis, and wherein the X-band dual-polarized SWGA array unit cell has a cross-polarization isolation of about −60 decibels (dB) or less.

2. The X-band dual-polarized SWGA array unit cell of claim 1, wherein the 1D electronic-scanning range is within a range of 84° (±42°)to 180° (±90°).

3. The X-band dual-polarized SWGA array unit cell of claim 1, wherein the cross-polarization isolation is in a range of about −60 dB to about −70 dB.

4. The X-band dual-polarized SWGA array unit cell of claim 1, wherein the conventional waveguide comprises standardized dimensions.

5. The X-band dual-polarized SWGA array unit cell of claim 1, wherein $\lambda_o$ is a free-space wavelength.

6. A sub-array panel comprising:

a plurality of the X-band dual-polarized slotted waveguide antenna (SWGA) array unit cells, wherein each of the X-band dual-polarized SWGA array unit cells comprises:

a partial H-plane wayeguide with a metal vane; and a conventional wayeguide in a side-by-side arrangement with the partial H-plane waveguide, wherein a spacing between elements of the X-band dual-polarized SWGA array unit cells in an azimuth plane is in a range of about $0.6\lambda_o$ to about $0.5\lambda_o$, wherein the X-band dual-polarized SWGA array unit cells have a one-dimensional (1D) electronic-scanning range of at least 84° (±42°) in the azimuth plane perpendicular to a waveguide axis, and wherein the X-band dual-polarized SWGA array unit cells have a cross-polarization isolation of about −60 decibels (dB) or less.

7. The sub-array panel of claim 6, wherein the plurality of the X-band dual-polarized SWGA array unit cells comprises 4 to 676 of the X-band dual-polarized SWGA array unit cells.

8. The sub-array panel of claim 6, wherein the plurality of the X-band dual-polarized SWGA array unit cells comprises 4 to 400 of the X-band dual-polarized SWGA array unit cells.

9. The sub-array panel of claim 6, wherein the plurality of the X-band dual-polarized SWGA array unit cells comprises 4 to 256 of the X-band dual-polarized SWGA array unit cells.

10. The sub-array panel of claim 6, wherein the plurality of the X-band dual-polarized SWGA array unit cells comprises 64 to 144 of the X-band dual-polarized SWGA array unit cells.

11. The sub-array panel of claim 6, wherein the plurality of the X-band dual-polarized SWGA array unit cells comprises $n^2$ of the X-band dual-polarized SWGA array unit cells arranged in an nxn configuration, and wherein n is in a range of from 2 to 26.

12. The sub-array panel of claim 6, wherein the plurality of the X-band dual-polarized SWGA array unit cells comprises $n^2$ of the X-band dual-polarized SWGA array unit cells arranged in an nxn configuration, and wherein n is in a range of from 4 to 16.

13. The sub-array panel of claim 6, wherein the plurality of the X-band dual-polarized SWGA array unit cells comprises $n^2$ of the X-band dual-polarized SWGA array unit cells arranged in an nxn configuration, and wherein n is in a range of from 8 to 12.

14. The sub-array panel of claim 6, wherein the 1D electronic-scanning range is within a range of 84° (±42°) to 180° (±90°).

15. The sub-array panel of claim 6, wherein the cross-polarization isolation is in a range of about −60 dB to about −70 dB.

16. The sub-array panel of claim 6, wherein the conventional waveguide comprises standardized dimensions.

17. The sub-array panel of claim 6, wherein $\lambda_o$ is a free-space wavelength.

18. A radar array comprising:

a plurality of sub-array panels, wherein each of the sub-array panels comprises a plurality of X-band dual-polarized slotted waveguide antenna (SWGA) array unit cells, wherein each of the X-band dual-polarized SWGA array unit cells comprises:

a partial H-plane waveguide with a metal vane; and a conventional waveguide in a side-by-side arrangement with the partial H-plane waveguide, wherein a spacing etween elements of the X-band dual-polarized SWGA array unit cells in an azimuth plane is in a range of about $0.6\lambda_o$ to about 0. $5\lambda_o$, wherein the X-band dual-polarized SWGA array unit cells have a one-dimensional (1D) electronic-scanning range of at least 84° (±42°) in the azimuth plane perpendicular to a waveguide axis, and wherein the X-band dual-polarized SWGA array unit cells have a cross-polarization isolation of about −60 decibels (dB) or less.

19. The radar array of claim 18, wherein the plurality of the X-band dual-polarized SWGA array unit cells comprises 4 to 676 of the X-band dual-polarized SWGA array unit cells.

20. The radar array of claim 18, wherein the plurality of the X-band dual-polarized SWGA array unit cells comprises 4 to 400 of the X-band dual-polarized SWGA array unit cells.

* * * * *